(12) United States Patent
Kim

(10) Patent No.: US 12,215,850 B2
(45) Date of Patent: Feb. 4, 2025

(54) HOME APPLIANCE

(71) Applicant: LG ELECTRONICS INC., Seoul (KR)

(72) Inventor: Junggyu Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 300 days.

(21) Appl. No.: 17/993,685

(22) Filed: Nov. 23, 2022

(65) Prior Publication Data

US 2023/0160568 A1  May 25, 2023

(30) Foreign Application Priority Data

Nov. 23, 2021 (KR) .......................... 10-2021-0162152

(51) Int. Cl.
*F21V 33/00* (2006.01)
*F21V 8/00* (2006.01)
*F25D 27/00* (2006.01)

(52) U.S. Cl.
CPC .......... *F21V 33/0044* (2013.01); *F25D 27/00* (2013.01); *G02B 6/0091* (2013.01)

(58) Field of Classification Search
CPC .......... F25D 27/00; F25D 27/04; F25D 23/02; F25D 2327/00; F25D 2327/001; F21V 33/0044; F21S 4/28; G02B 6/0091
See application file for complete search history.

(56) References Cited

U.S. PATENT DOCUMENTS

| 8,789,900 | B2 | 7/2014 | Laible et al. |
| 2023/0018403 | A1* | 1/2023 | Park ........................ F25D 27/00 |
| 2023/0134292 | A1* | 5/2023 | Hong .................. F21V 33/0012 362/92 |

FOREIGN PATENT DOCUMENTS

CN  103250018  8/2013

* cited by examiner

*Primary Examiner* — Thomas M Sember
(74) *Attorney, Agent, or Firm* — KED & ASSOCIATES, LLP

(57) ABSTRACT

A home appliance includes a cabinet defining a storage space and a door including a door body to open and close the storage space, and a panel assembly mounted on a front surface of the door body. The panel assembly includes a panel defining an outer appearance of a front surface of the door and through which light is transmitted, a light guide plate provided behind the panel to guide light toward the panel, a lighting device including a plurality of LEDs irradiating light having a set color toward the light guide plate and a substrate on which the LEDs are mounted, and a bracket on which the lighting device is mounted. A substrate protrusion, which protrudes toward a front surface of the door body and to which a wire is connected, is disposed on the substrate, and the bracket includes one or more support portions supporting the substrate protrusion.

21 Claims, 32 Drawing Sheets

HOME APPLIANCE

CROSS-REFERENCE TO RELATED APPLICATION(S)

The present application claims priority under 35 U.S.C. 119 and 35 U.S.C. 365 to Korean Patent Application No. 10-2021-0162152, filed in Korea on Nov. 23, 2021, which is hereby incorporated by reference in its entirety.

BACKGROUND

1. Field

The present disclosure relates to a home appliance.

2. Background

In general, home appliances are disposed in an indoor space and may be disposed to be harmonized with the surrounding space. In addition, to further improve the appearance of the home appliance, a panel defining an outer appearance on a front surface of the home appliance may be provided. Typically, structures that variously modify the outer appearance of the front surface of the refrigerator so as to be harmonized with environments in which the refrigerator is placed, surrounding furniture, or other home appliances are being developed, and this trend is being made throughout the home appliances.

U.S. Pat. No. 8,789,900 discloses a structure in which a decoration panel defining an outer appearance is installed on a door front of a refrigerator, and here, the outer appearance of the door front is defined according to a user's preference by detachably configuring the decoration panel. However, the refrigerator having this structure has a problem in that, when a user wants to change the outer appearance, the entire decoration panel needs to be removed and replaced, and it is not possible to use the decoration panel before replacement any longer.

To solve this limitation, Chinese Patent Application No. 103250018 discloses a refrigerator in which a reflective layer and a transparent panel are disposed on a door front and colored light emitting members are mounted on both side ends of the reflective layer to cause the transparent panel to shine with set color. However, in such a structure, it is not easy to replace the transparent panel, and there is a limitation in that maintenance is not easy because of disassembling the entire door to repair and replace the light emitting member in case of abnormality of the light emitting member.

In addition, when such a structure is applied to the door, there is a limitation in that a thickness of the door becomes thick because power and control-related components for an arrangement of the light emitting member and an operation of the light emitting member are disposed in the door. Particularly, when the thickness of the door is maintained in the refrigerator, there is a limitation in that insulation performance of the door is deteriorated due to the arrangement of the light emitting member.

BRIEF DESCRIPTION OF THE DRAWINGS

The embodiments will be described in detail with reference to the following drawings in which like reference numerals refer to like elements wherein:

FIG. 27 is a front view illustrating the outer appearance of the front surface of the refrigerator in a state in which the lighting device of the refrigerator is turned on;

FIG. 32 is a front view of a front appearance of a refrigerator in the state in which a lighting device of the refrigerator is turned on.

DETAILED DESCRIPTION

Hereinafter, detailed embodiments will be described in detail with reference to the accompanying drawings. However, the present disclosure is limited to the embodiments in which the spirit of the present invention is proposed, and other degenerate idea or other embodiments included in the scope of the present invention may be easily proposed by addition, changes, deletions, etc. of other elements.

Prior to a description, directions are defined. In an embodiment of the present disclosure, a direction toward a door is defined as a front direction with respect to a cabinet shown in FIGS. 1 and 2, a direction toward the cabinet with respect to the door is defined as a rear direction, a direction toward a bottom on which a refrigerator is installed is defined as a downward direction, and a direction away from the bottom is defined as an upward direction.

Figure 1:
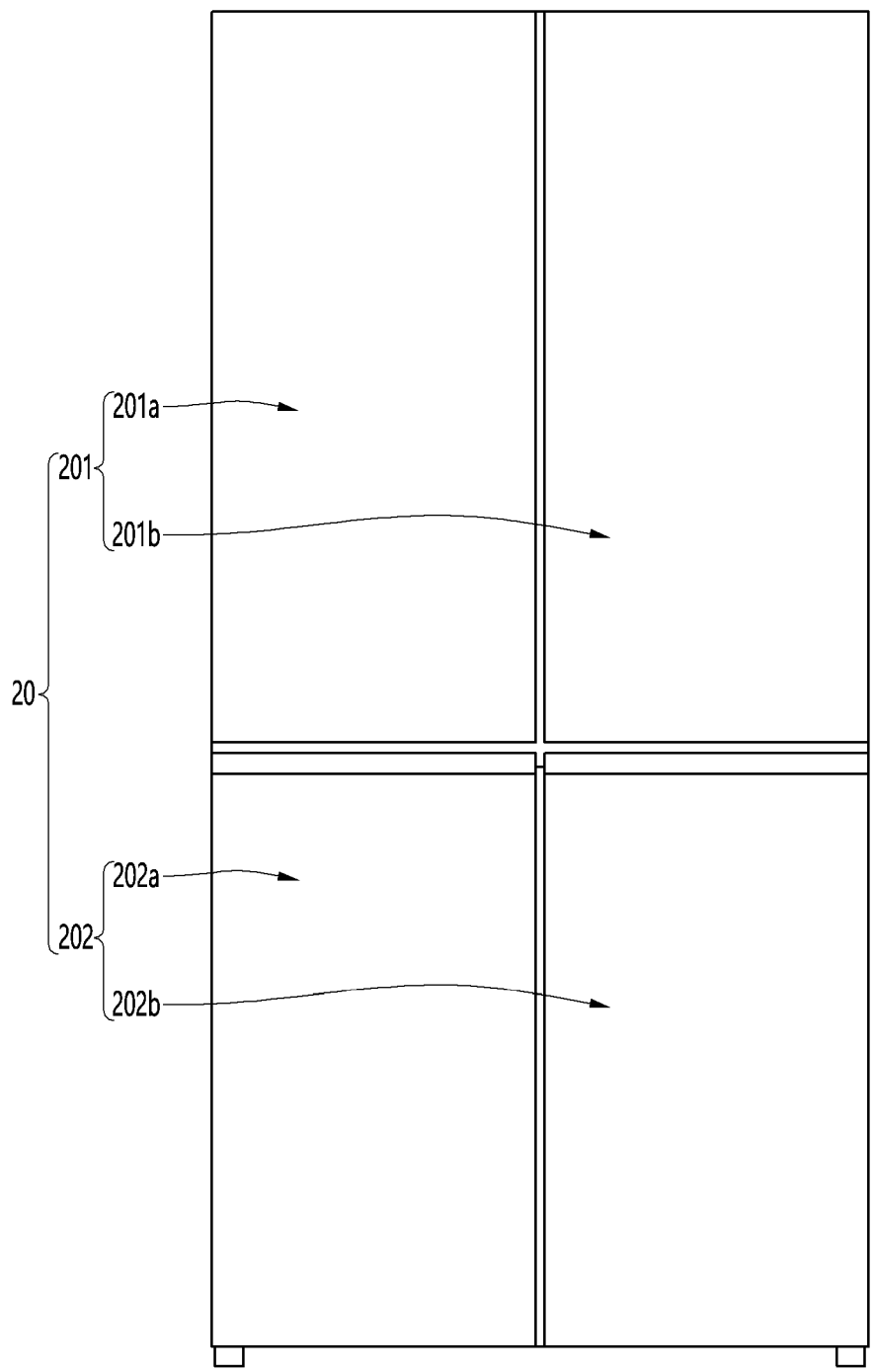
FIG. 1 is a front view of a refrigerator according to an embodiment.
Figure 2:
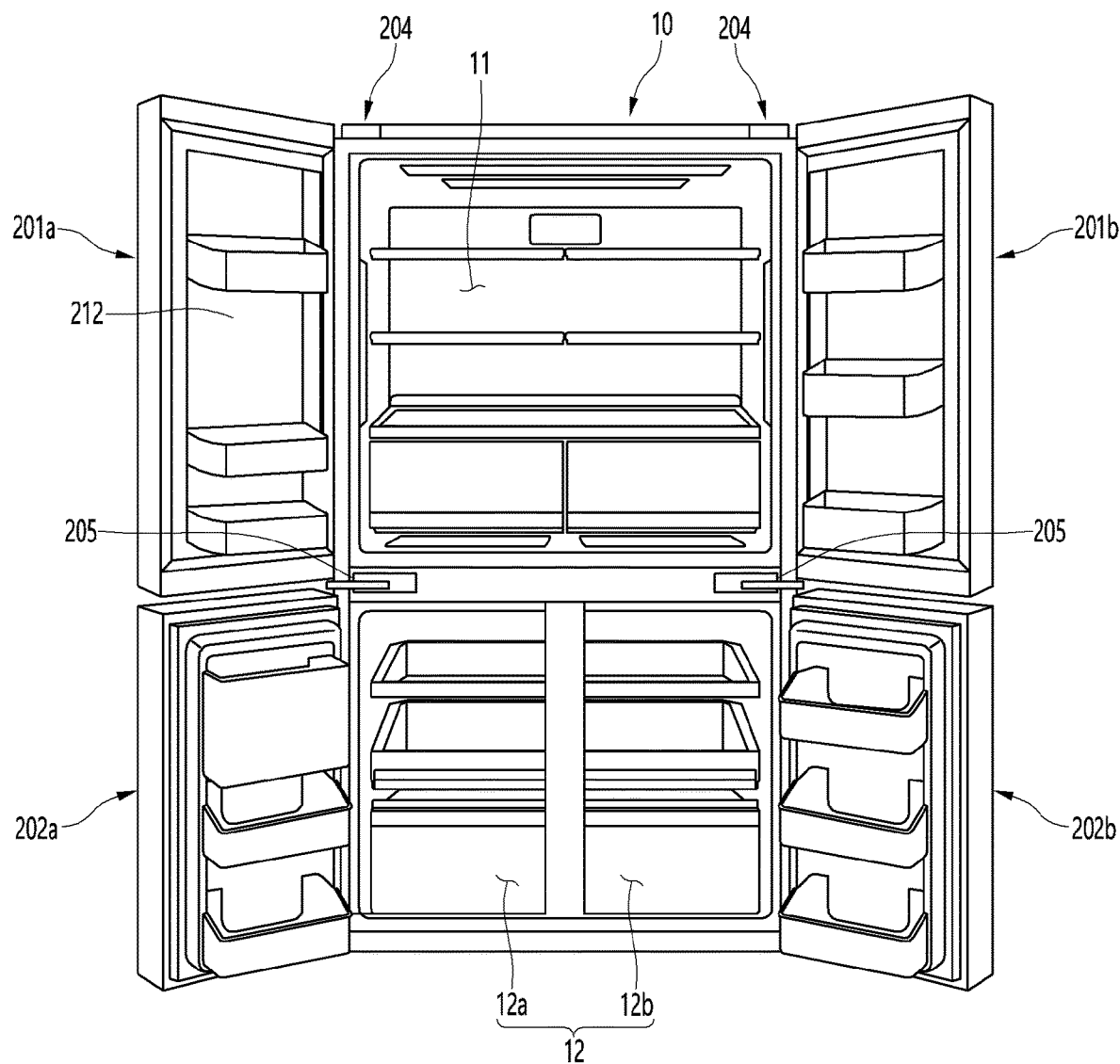
FIG. 2 is a front view illustrating a state in which a door of the refrigerator is opened.

FIG. 1 is a front view of a refrigerator according to an embodiment. Also, FIG. 2 is a front view illustrating a state in which a door of the refrigerator is opened. As illustrated in the drawings, an outer appearance of a refrigerator 1 according to an embodiment may be defined by a cabinet 10 in which a storage space is defined, and a door 20 for opening and closing the storage space of the cabinet 10.

For example, the cabinet 10 may define the storage space partitioned in a vertical direction. Here, a refrigerating compartment 11 may be defined at an upper portion of the cabinet 10, and a freezing compartment 12 may be defined at a lower portion of the cabinet 10. The refrigerating compartment 11 may be referred to as an upper storage space, and the freezing compartment 12 may be referred to as a lower storage space. In addition, the freezing compartment 12 may be divided into left and right sides to define a left freezing chamber 12a and a right freezing chamber 12b. The left freezing compartment 12a may be referred to as a left lower storage space, and the right freezing compartment 12b may be referred to as a right lower storage space.

The door 20 may be configured to open and close each of the refrigerating compartment 11 and the freezing compartment 12. For example, the door 20 may be rotatably mounted to the cabinet 10, and each of the refrigerating compartment 11 and the freezing compartment 12 may be opened and closed by the rotation. Of course, the door 20 may also be withdrawn to open and close each of the refrigerating compartment and the freezing compartment.

The door 20 may include a refrigerating compartment door 201 that opens and closes the refrigerating compartment 11 and a freezing compartment door 202 that opens and closes the freezing compartment 12. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door, which are arranged side by side. The left refrigerating compartment door 201a and the right refrigerating compartment door 201b may be disposed adjacent to each other and may have the same size. In addition, the left refrigerating compartment door 201a and the right refrigerating compartment door 201b may independently rotate to open and close the refrigerating compartment 11.

Upper and lower ends of the refrigerating compartment door 201a and the freezing compartment door 201b may be coupled to the cabinet 10 by hinge devices 204 and 205, respectively. The hinge device 204 may include an upper hinge 204 and a lower hinge 205, and the refrigerator compartment door 201a and the freezing compartment door 201b may be rotatably mounted thereon.

In addition, the freezing compartment door 202 may include a pair of a left freezing compartment door 202a and a right freezing compartment door 202b, which are arranged side by side. In addition, the left freezing compartment door 202a and the right freezing compartment door 202b may independently rotate to open and close the freezing compartment. The left freezing compartment door 202a and the right freezing compartment door 202b may be disposed adjacent to each other and may have the same size. Of course, although the refrigerator having a structure in which a refrigerating compartment 11 is disposed at an upper side, and a freezing compartment 12 is disposed at a lower side is described as an example in the embodiment, the present disclosure may be applied to all types of refrigerators equipped with a door without being limited to types of refrigerators.

An outer appearance of the front surface of the refrigerator 1 may be defined in the state in which the door 20 is closed and may define the out appearance of the refrigerator 1 viewed from the front in the state in which the refrigerator 1 is installed. The door 20 may have a structure in which a front surface selectively emits light and may be configured to shine with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings. In addition, an embodiment of the present disclosure will be described with reference to the left refrigerating compartment door 201a, and other doors 201b, 202a, and 202b may also have the same structure.

Figure 3:
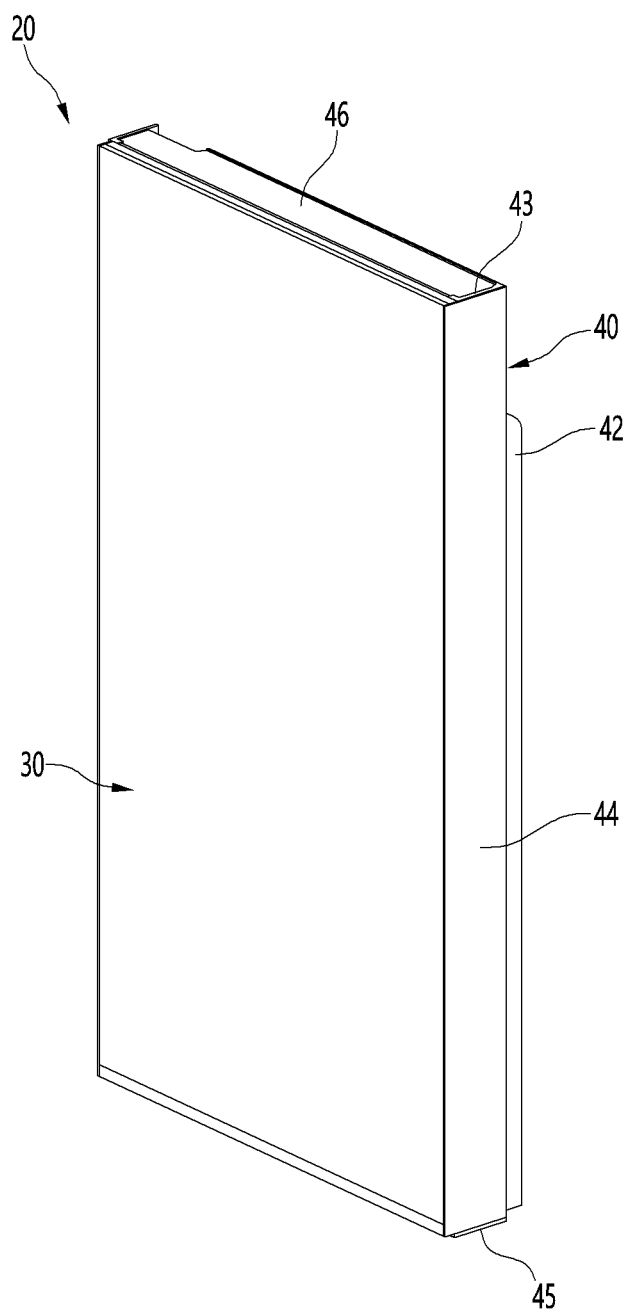
FIG. 3 is a perspective view of the door.
Figure 4:
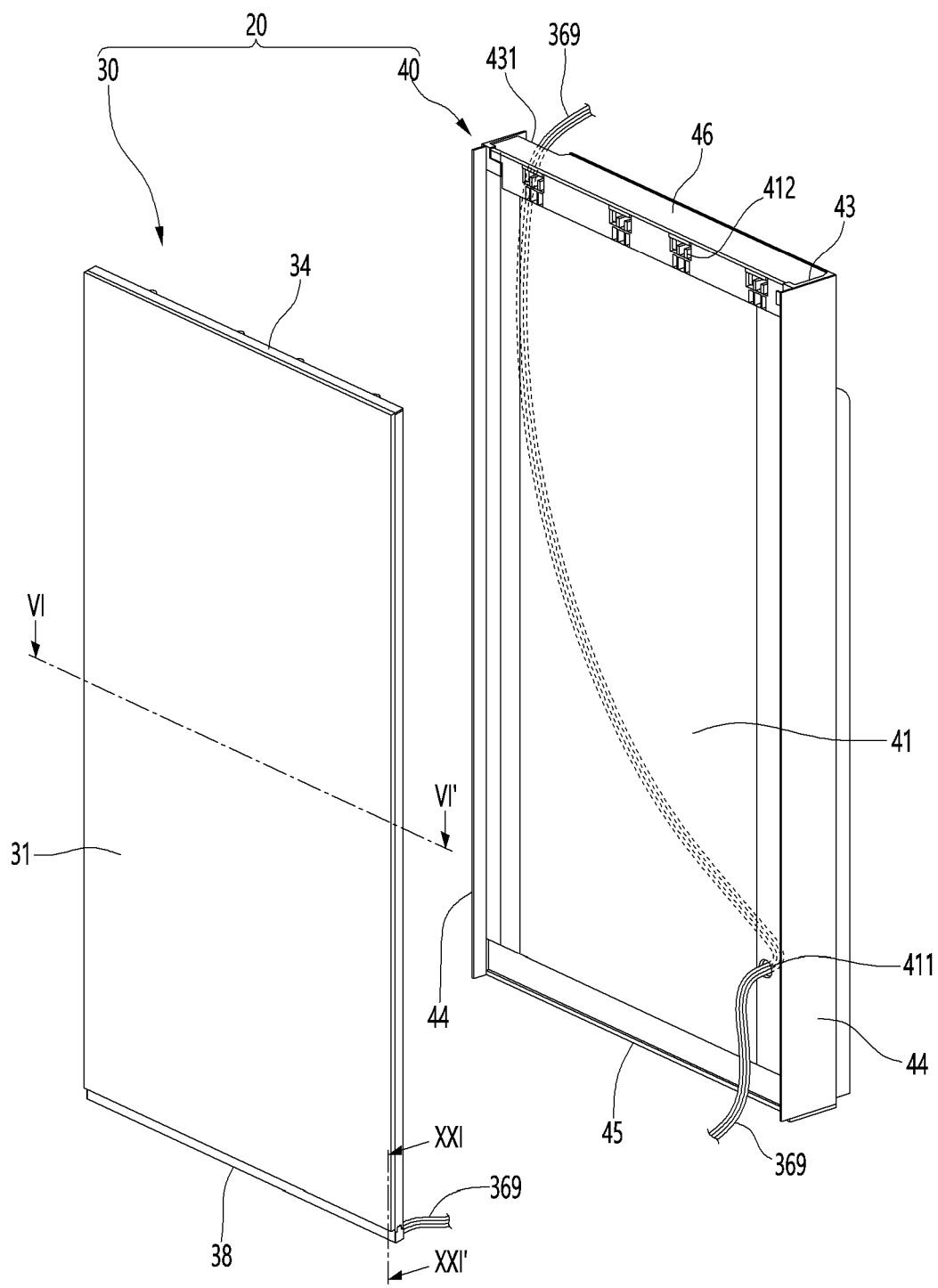
FIG. 4 is an exploded perspective view illustrating a state in which a panel assembly and a door body, which are components of the door, are separated from each other.
Figure 5:
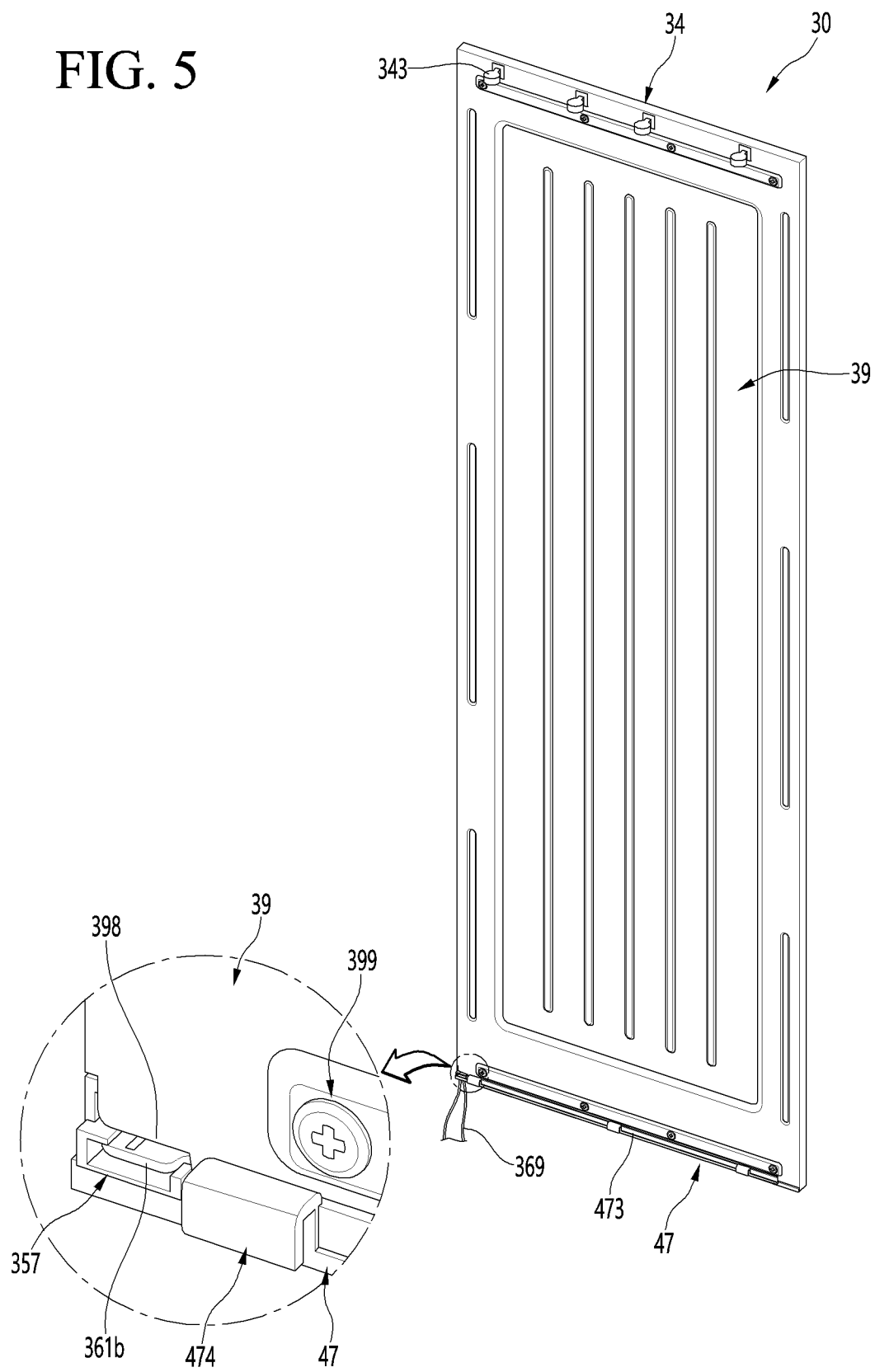
FIG. 5 is a rear perspective view of the panel assembly.

FIG. 3 is a perspective view of the door. Also, FIG. 4 is an exploded perspective view illustrating a state in which a panel assembly and a door body, which are components of the door, are separated from each other. Also, FIG. 5 is a rear perspective view of the panel assembly.

As illustrated in the drawings, the door 20 may include a door body 21 defining the overall shape of the door 20, and a panel assembly 30 defining an outer appearance of a front surface of the door 20. That is, the door 20 may be configured so that the panel assembly 30 is mounted on a front surface of the door body 40.

The door body 40 may include a body plate 41 defining a front surface and a door liner 42, 212 defining a rear surface. The body plate 41 may be made of a metal material and disposed to face a rear surface of the panel assembly 30. The door liner 42 may be made of a plastic material and may form a bottom shape of the door 20.

The door body 40 may include a side decoration 44 defining right and left side surfaces of the door body 21. The side decoration 44 may connect both right and left ends of the body plate 41 and both right and left ends of the door liner 42.

The door body 40 may include an upper cap decoration 43 and a lower cap decoration 45 that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be defined by the body plate 41, the door liner 42, the side decoration 44, the upper cap decoration 43, and the lower cap decoration 45. In addition, an insulator may be filled in an internal space of the door body 40, which is defined by coupling the body plate 41, the door liner 42, the side decoration 44, the upper cap decoration 43, and the lower cap decoration 45.

The panel assembly 30 may be inserted into and mounted on the front surface of the door body 40. For example, the side decoration 44 may further protrude forward and may be in contact with both ends of the panel assembly 30. In addition, a top surface of the panel assembly 30 may define the same plane as the upper cap decoration 43 to define the top surface of the door 20, and the bottom surface of the panel assembly 30 has the lower cap decoration 45 to define the same plane as the bottom surface of the door 20.

In addition, a wire 369 connected to the panel assembly 30 may be disposed on the door body 40. The wire 369 may be provided as a plurality of wire-type electrical wires and may be connected to the lighting device 36 of the panel assembly 30.

The wire 369 may be connected to the panel assembly 30 via the inside of the door body 40. In detail, one end of the wire 369 may be connected to the lighting device 36, lead into the door body 40 through a wire hole 411 defined in the front surface of the door body 40, and lead out of the door body 40 through the hinge mounting portion 431 disposed on an upper end of the door body 40.

The wire hole 411 may be opened to pass through the body plate 41 and may be disposed at a side that is farther from one side on which the upper hinge 204 is mounted among left and right sides. For example, the upper hinge 204 may be mounted at the left side of the door 20, and thus, the wire hole 411 may be defined in the right side of the body plate 41.

The upper hinge 204 may be mounted on the hinge mounting portion 431, and the wire 369 may be guided to the cabinet 10 through the upper hinge 204 and be connected to the controller 13 disposed on the cabinet 10. The wire 369 may have a structure connected between the panel assembly 30 and the door body 40 by a connector. Thus, when the panel assembly 30 is separated and mounted on the door body 40, the wire 369 may be easily connected.

The panel assembly 30 may be provided in a plate shape and may define an outer appearance of the front surface of the door 20 while being mounted on the front surface of the door body 40. Since the panel assembly 30 may form the outer appearance of the front surface of the door 20, the panel assembly 30 may be referred to as a door panel, and since the panel assembly 30 may form the outer appearance of the front surface of the refrigerator 1, the panel assembly 30 may also be referred to as an exterior panel.

The panel assembly 30 may be detachably mounted on the door body 40. An upper protrusion 343 and a lower protrusion 473, 474, which protrude backward, may be disposed on upper and lower ends of the rear surface of the panel assembly 30, respectively. In addition, an upper mounting portion 412 on which the upper protrusion 343 is inserted and mounted may be opened at the upper end of the front surface of the door body 40, and the lower mounting portion into which the lower protrusions 473 and 474 are inserted and mounted may be disposed on the bottom surface of the door body 40, i.e., the lower cap decoration 45.

In addition, although not shown in detail, the upper protrusion 343 may be restricted by an upper cover 46 mounted on an opened top surface of the upper cap decoration 43. In addition, a screw that restricts the lower end of the panel assembly 30 may be coupled through the lower cap decoration 45, and thus, the panel assembly 30 may be firmly mounted to the door body 40.

In addition, as necessary, the panel assembly 30 may have a structure that is detachably mounted on the door body 40 for services and maintenance. In the state in which the panel assembly 30 is separated, the substrate protrusion 361*b* of the lighting device 36 may be exposed to the lower end of the rear surface of the panel assembly 30, and the wire 369 may be connected thereto.

In this case, the substrate protrusion 361*b* may protrude backward and also may protrude more than the back cover 39 defining the rear surface of the panel assembly 30. In addition, a cover opening 398 that is opened so that the substrate protrusion 361*b* and a protrusion guide 357 protrude may be further defined in an edge of a lower end of the back cover 39. For example, the cover opening 398 may be provided by cutting edges of side and lower ends of the back cover 39.

The substrate protrusion 361*b*, the protrusion guide 357 and/or the cover opening 398 may be disposed at one end that is far from the mounting position of the upper hinge 204 and the lower hinge 205 among the left and right sides. Thus, when the panel assembly 30 is detached, an interference with the lower hinge 205 may be minimized. That is, the substrate protrusion 361*b*, the protrusion guide 357, and/or the cover opening 398 may be disposed at one side of the rotation shaft of the door 20 among the left and right sides. In addition, the substrate protrusion 361*b* may be disposed at a position facing the wire hole 411, and the wire 369 may be more easily connected.

A front surface of the panel assembly 30 may be exposed forward in the state in which the panel assembly 30 is mounted on the door body 40, and the panel assembly 30 may substantially form the outer appearance of the front surface of the door 20. That is, a color of the outer appearance of the front surface of the door 20 may be determined by a color of the front surface of the panel assembly 30. In addition, the entire front surface of the panel assembly 30 may be configured to shine in a color specified by the user through the lighting device 36 and may be changed to various colors selected by the user to express the color of the front surface of the door 20 in various manners.

Figure 6:
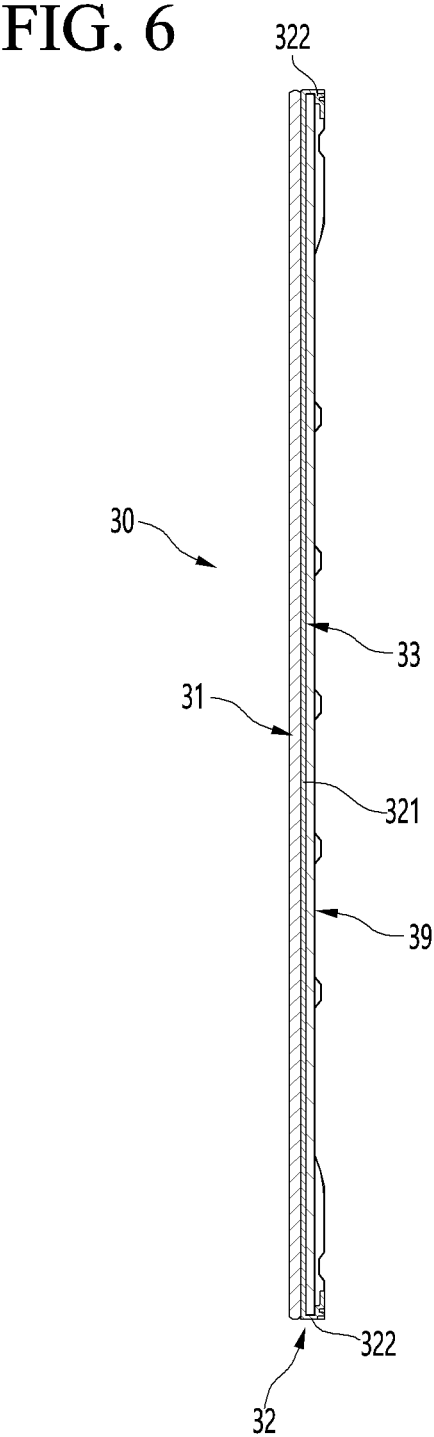
FIG. 6 is a cross-sectional view taken along line VI-VI' of FIG. 4.
Figure 7:
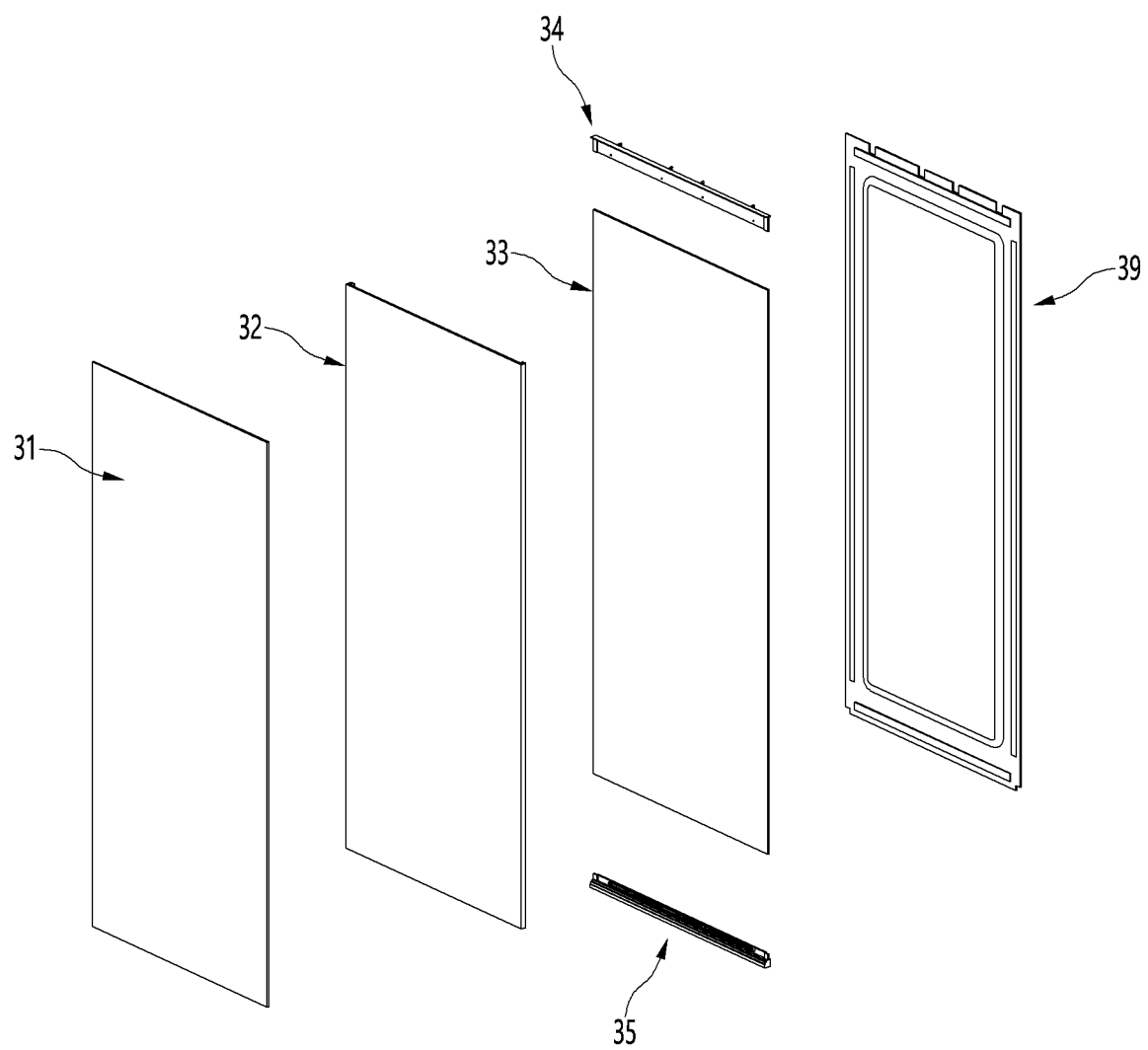
FIG. 7 is an exploded perspective view of the panel assembly.

Hereinafter, the structure of the panel assembly 30 will be described in more detail with reference to drawings. FIG. 6 is a cross-sectional view taken along line VI-VI' of FIG. 4. Also, FIG. 7 is an exploded perspective view of the panel assembly. As illustrated in the drawings, the panel assembly 30 may include a panel 31 forming an outer appearance of the front surface, the lighting device 36 emitting light to cause the panel 31 to shine, a light guide plate 33 guiding light emitted from the lighting device 36, and a transmission member 32 on which the panel 31 is mounted.

The panel assembly 30 may include an upper bracket 34 forming a top surface of the panel assembly 30 and a lower bracket 35 forming a bottom surface of the panel assembly 30. The lighting device 36 may be mounted on the lower bracket 35. The panel assembly 30 may further include a back cover 39 forming a rear surface.

In more detail, the panel 31 may be provided in a rectangular plate shape and may be made of a material that transmits light therethrough. For example, the panel 31 may be made of a glass material such as blue glass, white glass, and vapor deposition glass or may be made of other materials for transmitting light therethrough, such as acrylonitrile butadiene styrene (ABS), a polymethyl methacrylate (PMMA), or a polycarbonate (PC). In addition, the panel 31 may have a thickness set so as not to be easily broken due to characteristics of defining an outer appearance thereof. The panel 31 may have a thickness greater than that of the light guide plate 33. For example, the panel 31 may have a thickness of approximately 3 mm to 5 mm. The panel 31 may be referred to as a transparent plate or an out plate.

The panel 31 may be transparent to allow light reflected by the light guide plate 33 to be transmitted. In this case, the transparency may be defined as a degree to which the light reflected from the light guide plate 33 is transmitted and irradiated to the outside to identify that the panel 31 shines in a specific color. In addition, in all embodiments of the present disclosure, the terms "transparent" and "transmission" may be defined as a state in which the light passes to display a set color through the panel 31.

In addition, the panel 31 may be provided to have a color. That is, in a state in which the lighting device 36 is turned off, a color of the front surface of the door 20 may be expressed by the color of the panel 31. The color of the panel 31 may not be changed in a state in which the lighting device 36 is turned off, and the user may select and install a color desired by the user through replacement of the panel assembly 30. In addition, the color of the panel 31 may be defined as a first color when the lighting device 36 is turned off. That is, the color of the panel 31 itself may be defined as the first color.

For example, a specific design or pattern may be printed on the panel 31 to have specific color. A film with a specific design or pattern printed thereon may be added to the panel 31, surface treatment such as imprinting, etching, and glass printing may be performed on the panel 21, or a coating or deposition layer having specific color and texture may be provided to define an outer appearance of the panel 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the panel 31 due to the color of the panel 31.

Here, the panel 31 may be provided with a color layer 311 having a color. Here, in an off state, the color layer 311 may have at least color having brightness equal to or greater than 0 other than black. That is, in a state in which the refrigerator 1 is installed, the front surface of the refrigerator 1 may be displayed in a color other than black, and the color of the front surface of the refrigerator may be changed according to an operation of the lighting device 36.

The panel 31 may define the outer appearance of the front surface of the panel assembly 30, which is exposed to the outside. The panel 31 may have a size less than that of the light guide plate 33. Thus, the light emitted from the light guide plate 33 toward the panel 31 may be evenly irradiated to the entirety including an outer end the panel 31, and the entire panel 31 may be brightly shine without being partially darkened.

A rear surface of the panel 31 may be mounted on a front surface of the transmission member 32. Here, a horizontal width of the panel 31 may correspond to a horizontal width of the transmission member 32. Thus, in the state in which the panel 31 is mounted, both left and right ends of the transmission member 32 and both left and right ends of the panel 31 may be disposed on the same plane and define both left and right surfaces of the panel assembly 30. Thus, in the state in which the panel 31 is attached to the transmission member 32, when viewed from the front, the components disposed behind the panel in addition to the transmission member 32 may not be exposed to the outside, and the outer appearance of the front surfaces of the panel assembly 30 and the door 20 may be defined.

The light guide plate 33 may be positioned at a rear spaced apart from the panel 31 and may be configured to guide light emitted from the lighting device 36 disposed below the light guide plate 33 forward toward the panel 31. For example, the light guide plate 33 may be made of a transparent acrylic, plastic, or transparent polymer material. The light guide plate 33 may have a diffusing agent added thereto for diffusing light entrance on the light guide plate 33 or a pattern for diffusing light may be further formed on the light guide plate 33. Thus, light may be transferred to the panel 31 by the light guide plate 33, and in this case, a pattern of the light guide plate 33 may be set to cause the entire front surface of the panel 31 to glow with uniform brightness.

For example, the light guide plate 33 may have a pattern that increases in density upward from a center of the light guide plate 33 so as to have uniform brightness as a whole, and the density of the pattern may gradually increase from the center toward both left and right sides. In addition, the pattern may not be provided at a position closest to the lighting device 36 on the lower end of the light guide plate 33, or the density of the pattern may be provided to be relatively low.

The light guide plate 33 may be entirely provided in a rectangular plate shape and may be formed with a size somewhat greater than that of the panel 31. In detail, the light guide plate may have a width less than that of a left and right width of the panel 31 and greater than a vertical length of the panel 31 so as to be mounted on the transmission member 32.

In addition, although not shown in detail, a reflective layer 331 may be disposed on a rear surface of the light guide plate 33 so that light inside the light guide plate 33 is directed forward. Thus, the light moving along the light guide plate 33 may be induced to be irradiated toward the panel 31. In addition, the reflective layer may be disposed on each of both ends and an upper end of the light guide plate 33 except for the lower side, on which the lighting device 36 is mounted, so that all the light is directed to the inside of the light guide plate 33 without leaking around the light guide plate 33, and thus, the panel 31 may shine more brightly and uniformly. The light guide plate 33 may be supported by the back cover 39 from the rear and may be fixed to be maintained at a predetermined interval from the panel 31 by the transmission member 32.

The transmission member 32 may be disposed between the panel 31 and the light guide plate 33. The transmission member 32 may be used to fixedly mount the light guide plate 33 and the panel 31, and in particular, may maintain the light guide plate 33 at a predetermined interval from the panel 31.

The transmission member 32 may have a front surface supporting the panel 31 and both left and right surfaces that restrict the light guide plate 33 disposed at a rear side thereof. The transmission member 32 may be referred to as a support member or a fixing member because the panel 31 and the light guide plate 33 are mounted thereon. In addition, since the transmission member 32 is provided to allow light to pass therethrough, the transmission member 32 may be referred to as a transparent plate. In addition, since the transmission member 32 may have a structure including the side surface of the panel assembly 340, the transmission member 32 may be referred to as a panel frame.

The transmission member 32 may be made of a material capable of transmitting light therethrough and may be provided as a whole by injection or extrusion as a single component. That is, the transmission member 32 may be made of a material having a property of allowing light to pass through and having moldability. For example, the transmission member 32 may be made of an optically transparent ABS material. In addition, the transmission member 32 may be made of various transparent plastic materials, such as polycarbonate (PC), acrylic, or the like. The light reflected from the light guide plate 33 may be transmitted to pass through the panel 31.

The light transmission performance and transparency of the transmission member 32 means a degree to which light irradiated from the rear light guide plate 33 passes through the transmission member 32 to illuminate the panel 31. In addition, a light diffusing agent may be added when the transmission member 32 is molded. The light diffusing agent may diffuse the light passing through the transmission member 32 and may allow the light to be irradiated more evenly to the entire front panel 31.

The transmission member 32 may be entirely made of a resin material. Also, the panel 31 may be mounted on the front surface of the transmission member 32 with respect to the transmission member 32, and the light guide plate 33 may be disposed on the rear surface of the transmission member 32.

The transmission member 32 may include a front surface portion (or front surface wall) 321 having a plate shape, and a side surface portion (or side surface wall) 322 that protrudes backward from each of both right and left ends of the front surface portion 321. The front surface portion 321 may be disposed between the panel 31 and the light guide plate 33, the front surface may support the panel 31, and the rear surface may support the light guide plate 33.

The front surface portion 321 may be provided in the plate shape having a size corresponding to that of the panel 31, and an adhesive member 313 may be applied around the front surface portion 321 so that the panel 31 adheres to the transmission member 32. Here, the adhesive member 313 may be made of a transparent material or a material capable of transmitting light, and the panel 31 may be configured so that the entire area including an area to which the adhesive member 313 is applied shines.

A left and right width of the front surface portion 321 may be the same as a left and right width of the panel 31. In addition, the upper end of the front surface portion 321 may protrude more upward than the upper end of the panel 31, and the lower end of the front surface portion 321 may protrude more than the lower end of the panel 31. That is, the front surface portion 321 may have a size greater than that of the panel 31, and in particular, may have a length greater than a vertical length of the panel 31.

In addition, the front surface portion 321 may have a structure connecting the side surface portions 322 respectively disposed at both the left and right sides. That is, the front surface portion 321 may be continuously disposed between the side surface portion 322 and may extend from the side surface portion 322 at one side to the side surface portion 322 at the other side.

In the state in which the light guide plate 33 is mounted, the rear surface of the front surface portion 321 may be maintained in the state of being in contact with the front surface of the light guide plate 33. Thus, the light guide plate 33 may be always maintained at a constant distance from the panel 31. Here, the front surface portion 321 may be extruded to be maintained at set flatness, and thus, when the light guide plate 33 is mounted, the front surface portion 321 may be in contact with the entire front surface of the light guide plate 33. Thus, the molding may be performed to prevent an irregular interval or gap from occurring between the front surface portion 321 and the light guide plate 33.

The side surface portion 322 may be disposed along both the left and right ends of the light guide plate 33. The side surface portion 322 may be stepped with respect to upper and lower ends of the front surface portion 321 and may be provided to match side ends of the upper bracket 34 and the lower bracket 35.

The transmission member 32 may have the same cross-sectional structure in the vertical direction and thus may be simply molded by the extrusion. Simultaneously, a structure in which the panel 31 and the light guide plate 33 are mounted using the front surface portion 321 and the side surface portion 322 may be provided. In addition, the upper bracket 34 and the lower bracket 35 may be mounted through the structure of the side surface portion 322.

The upper bracket 34 may be provided at an upper end of the panel assembly 30. The upper bracket 34 may form a top surface of the panel assembly 30. The upper bracket 34 may be injection-molded with a plastic material, and may provide a structure coupled to the transmission member 32 and a structure coupled to the back cover 39.

The upper bracket 34 may extend from an upper left end to a right end of the transmission member 32 and may shield the transmission member 32 of the panel assembly 30 and an upper end of the light guide plate 33 so as not to be exposed. In addition, the upper bracket 34 may shield at least a portion of the upper end of the panel 31. Thus, when viewed from above, a top surface of the panel 31 may be defined by the upper bracket 34, and other components constituting the panel assembly 30 may be prevented from being exposed upward.

The back cover 39 may be coupled to the rear surface of the upper bracket 34. That is, when the back cover 39 is coupled, the upper bracket 34 may support the upper end of the light guide plate 33 at the rear side.

The lower bracket 35 may be provided at the lower end of the panel assembly 30. The lower bracket 35 may form a bottom surface of the panel assembly 30. The lower bracket 35 may be injection-molded with a plastic material and may provide a structure coupled to the transmission member 32 and a structure coupled to the back cover 39.

The lighting device 36 may be mounted on the lower bracket 35. The lighting device 36 may be provided inside the lower bracket 35 to irradiate light toward the light guide plate 33 and may be assembled and mounted with the lower bracket 35 in the state of being mounted on the lower bracket 35. The lower bracket 35 may be referred to as a light bracket or a bracket because the lighting device 36 is mounted thereon.

The lower bracket 35 may be coupled to a lower end of the transmission member 32 and may extend from a left end to a right end of the lower end of the transmission member 32. The back cover 39 may be coupled to the rear surface of the lower bracket 35. When the back cover 39 is coupled, the lower bracket 35 may support the light guide plate 33 at the rear side. Thus, during a process in which the panel assembly 30 is assembled, both right and left ends of the light guide plate 33 may be fixed by the transmission member 32, and the upper and lower ends of the light guide plate 33 may be supported by the upper bracket 34 and the lower bracket 35 at the rear side.

The back cover 39 may form a rear surface of the panel assembly 30 and may be coupled to the upper bracket 34 and the lower bracket 35. The back cover 39 may be made of a metal material such as stainless or aluminum. The back cover 39 may be formed with a size corresponding to the size of the panel assembly 30 and may form an entire shape of the rear surface of the panel assembly 30.

The rear surface of the light guide plate 33 may be supported by a cover protrusion 391 protruding on the center of the back cover 39, at the rear side. Thus, the light guide plate 33 may have a plate-shaped structure having a large size, but in the state in which the back cover 39 is mounted, the light guide plate 33 may have the overall stable support structure and may be maintained in the stably mounted state. The upper bracket 34 and the lower bracket 35 may be provided at positions corresponding to an upper end and a lower end of the back cover 39.

Right and left ends of a cover circumferential portion 392, which form a circumference of the back cover 39, may be in contact with the side surface portion 322 of the transmission member 32, and upper and lower ends of the cover circumferential portion 392 may be in contact with the upper bracket 34 and the lower bracket 35, respectively. A plurality of screws 399 may be coupled to the upper and lower ends of the cover circumferential portion 392 and may be coupled to the upper bracket 34 and the lower bracket 35 through the back cover 39 to fixedly mount the back cover 39.

Figure 8:
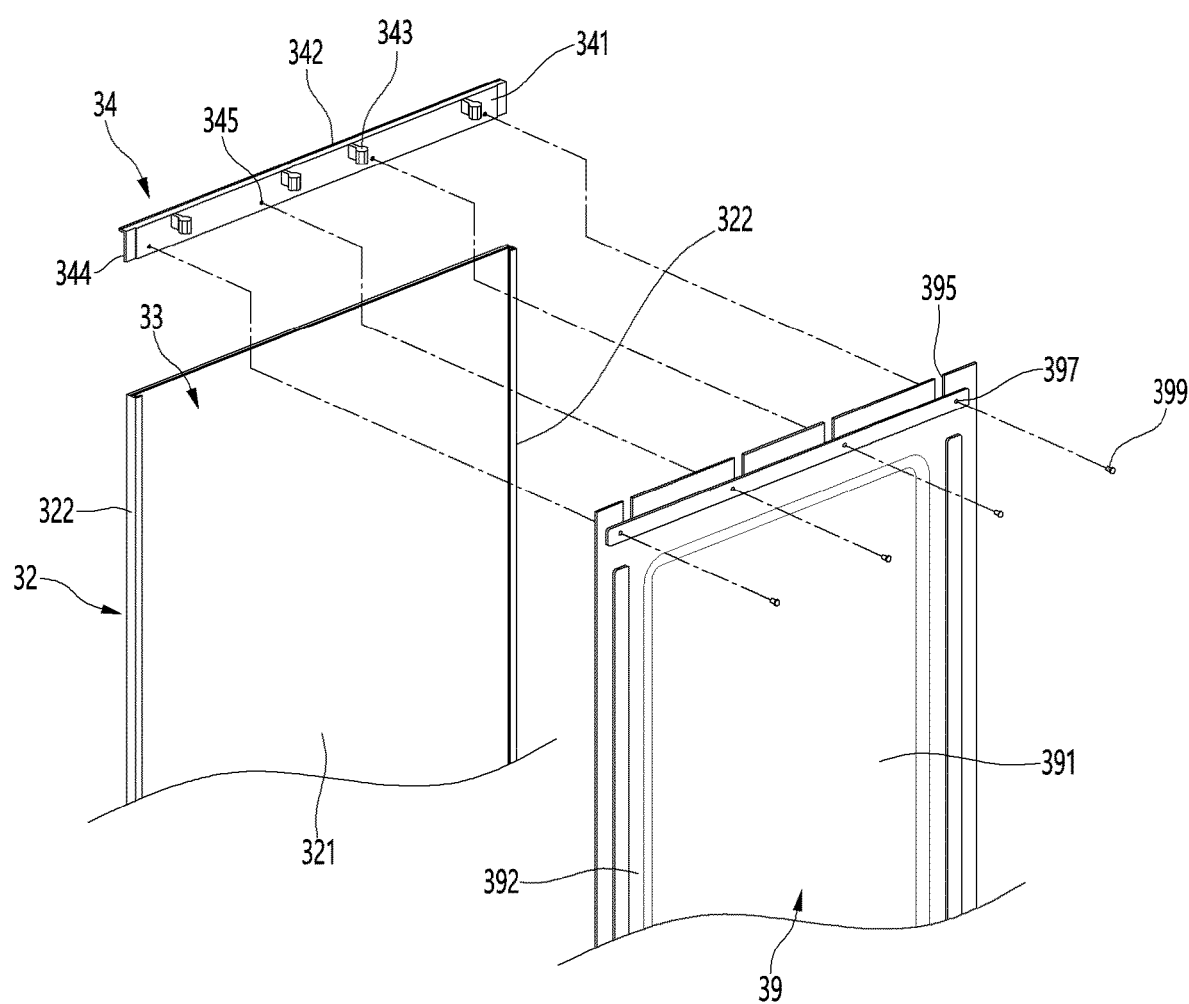
FIG. 8 is an exploded perspective view illustrating a state in which an upper bracket, a transmission member, and a back plate, which are components of the panel assembly, are disassembled.

The structure of each of the component constituting the panel assembly 30 will be described in more detail below with reference to the drawings. FIG. 8 is an exploded perspective view illustrating a state in which the upper bracket, the transmission member, and the back plate, which are components of the panel assembly, are disassembled.

As illustrated in the drawings, the upper bracket 34 may have a length corresponding to a length of the panel assembly 30 in a right and left direction. In addition, the upper bracket 34 may define a top surface of the panel assembly 30 in a state of being mounted on the transmission member 32.

In addition, the upper bracket 34 may include an upper bracket extension portion 341 and an upper bracket top surface portion 342 as a whole. The upper bracket extension portion 341 may be configured to the upper bracket 34 may be disposed in parallel with the panel 31 and the light guide plate 33 to extend in the vertical direction.

In addition, an upper bracket mounting portion 344 disposed to be stepped forward may be disposed on each of both left and right ends of the upper bracket extension portion 341. The upper bracket mounting portion 344 may be provided to be stepped with respect to the upper bracket extension portion 341 and may be inserted into an opened space of the upper end of the side surface portion 322 of the transmission member 32.

In the state in which the upper bracket 34 is mounted on the transmission member 32, the upper bracket mounting portion 344 may be fixed in the bracket insertion space 325, and the remaining upper bracket extension portion 341 may be exposed between both the side surface portions 322 to support the upper end of the back cover 39 and to be coupled to the upper end of the back cover 39.

The upper protrusion 343 protruding backward may be disposed on a rear surface of the upper bracket extension portion 341. The upper protrusion 343 may be configured to mount the panel assembly 30 and may be coupled to the upper mounting portion 412 of the front surface of the door body 40.

In addition, the upper protrusion 343 may protrude from an upper end of the rear surface of the upper bracket extension portion 341 and be provided in plurality at regular intervals along the upper bracket 34. In addition, the upper protrusion 343 may protrude to pass through the protrusion opening 395 of the back cover 39 when the back cover 39 is mounted.

An upper bracket screw hole 345 to be coupled to the screw 399 may be defined in the upper bracket extension portion 341. The upper bracket screw hole 345 may be defined at a position corresponding to the cover screw hole 397. Thus, when the back cover 39 is mounted, the screws 399 may be coupled to sequentially pass through the cover screw hole 397 and the upper bracket screw hole 345.

The upper bracket top surface portion 342 may be disposed on an upper end of the upper bracket extension portion 341. The upper bracket top surface portion 342 may define the top surface of the panel assembly 30 and may extend in a direction perpendicular to the upper bracket extension portion 341.

In detail, the upper bracket top surface portion 342 may extend forward from the upper end of the upper bracket extension portion 341. The front end of the upper bracket top surface portion 342 may extend to shield at least a portion of the upper end of the panel 31 and be disposed to shield upper ends of the transmission member 32 and the light guide plate 33.

Thus, the upper bracket 34 may be fixedly coupled to the upper end of the transmission member 32 and be in the state of being fixed to the back cover 39 by the screw 399 to restrict upward movement of the light guide plate 33 and define a shape of the top surface of the panel assembly 30.

Figure 9:
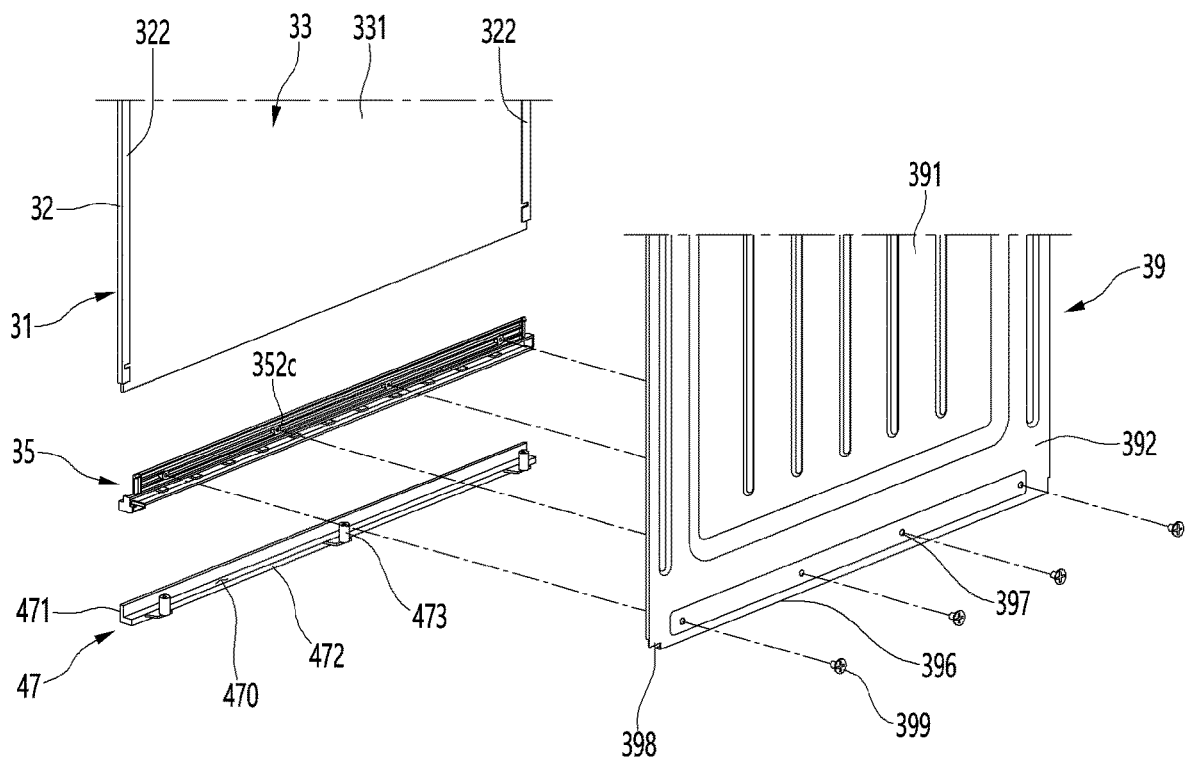
FIG. 9 is an exploded perspective view illustrating a state in which a lower bracket, the transmission member, and the back plate, which are components of the panel assembly, are disassembled.

FIG. 9 is an exploded perspective view illustrating a state in which the lower bracket, the transmission member, and the back plate, which are components of the panel assembly, are disassembled. As shown in the drawing, in the state in which the panel 31 is mounted on the front part 321 of the transmission member 32, and the light guide plate 33 is mounted on the side surface portion 322, the lower bracket 35 may be mounted on the lower end of the transmission member 32.

Here, the left and right side ends of the lower bracket rear surface portion 352 may be inserted into the opened space of the side surface portion 322, and thus, the lower bracket 35 may be fixedly mounted to the lower end of the transmission member 32.

A lower bracket screw hole 352c to which a plurality of screws 397b are coupled may be defined in the lower bracket rear surface portion 352. The lower bracket screw hole 352c may be defined at a position corresponding to a cover screw hole 397, and when the back cover 39 is mounted, the screw 399 may sequentially pass through the cover screw hole 397 and the lower bracket screw hole 352c and then be coupled.

The back cover 39 may be firmly coupled to the lower bracket 35 by coupling the screw 399, and the lower bracket 35 may be inserted into the transmission member 32 and be primarily fixed and then may be secondarily firmly fixed by the screw 399 coupled to the back cover 39. Since the lower bracket 35 is maintained in the firmly mounted state, the lower portion of the light guide plate 33 may be firmly supported by the lower bracket 35. Therefore, even when the door 20 is repeatedly opened or closed, or the light guide plate 33 is contracted and expanded due to heat, the light guide plate 33 may be maintained at the mounting position so that the light emitted from the lighting device 36 is secured to be irradiated to an accurate position.

The back cover 39 connected to the upper bracket 34 and the lower bracket 35 by the screw 399 may have an upper end supported on the upper bracket extension portion 341 and a lower end coupled to the lower bracket rear surface portion 352, and thus, both ends of the back cover 39 may be maintained in the state of being supported on the side surface portion 322. Thus, the back cover 39 may shield a space between the side surface portion 322, which is disposed at each of both left and right sides, the upper bracket 34, and the lower bracket 35 and define the rear surface of the panel assembly 30.

A cover bent portion 396 that is bent forward may be further disposed on a lower end of the back cover 39. The cover bent portion 396 may be inserted into the bracket opening 352a of the lower bracket rear surface portion 352 and may be in contact with a bottom surface of the heat dissipation member 37 that is in contact with the lighting device 36. Thus, heat generated during an operation of the lighting device 36 may be conducted to the entire back cover 39 through the heat dissipation member 37 and the cover bent portion 396 and thus may be effectively dissipated.

In addition, the cover opening 398 may be defined in the back cover 39. The cover opening 398 may be opened to expose the protrusion guide 357 and the substrate protrusion 361b. For example, the cover opening 398 may be provided by cutting edges of the lower end and the side end of the back cover 39.

The panel assembly 30 may include a lower decoration 47. The lower decoration 47 may define an outer appearance of the lower end of the panel assembly 30, and the lower end of the panel assembly 30 may be fixed to the door body 40.

The lower decoration 47 may be made of a plastic material and may be coupled under the lower bracket 35 to shield the lower bracket 35. That is, in the state in which the panel assembly 30 is mounted on the door body 40, the lower bracket 35 may not be exposed by the lower decoration 47 and be coupled to the door body 40.

The lower decoration 47 may have a length corresponding to that of the lower end of the panel assembly 30. In addition, the lower decoration 47 may include a decoration front surface 471 and a decoration bottom surface 472. A bracket mounting space 470 in which the lower bracket 35 is inserted and mounted may be defined by the decoration front surface 471 and the decoration bottom surface 472.

The decoration front surface 471 may shield the front surface of the lower bracket 35 and may extend up to the lower end of the panel 31. In addition, the decoration front surface 471 may be exposed to the lower end of the front surface of the panel assembly 30.

The decoration bottom surface 472 may support the lower bracket 35 from the lower side. In addition, although not shown in detail, a restriction groove in which the restriction protrusion protruding from the bottom surface of the lower bracket 35 is hooked to be restricted may be further defined in the decoration bottom surface 472. Thus, the lower decoration 47 may be coupled to the lower bracket 35 in the state of shielding the lower bracket 35 and may define the lower end of the panel assembly 30.

In addition, the lower protrusion 473 protruding upward after extending backward may be provided on a rear end of the decoration bottom surface 472. The lower protrusion 473 may be coupled to the lower portion of the door body 40 and may be maintained in the state in which the lower end of the panel assembly 30 is coupled to the door body 40.

Figure 10:
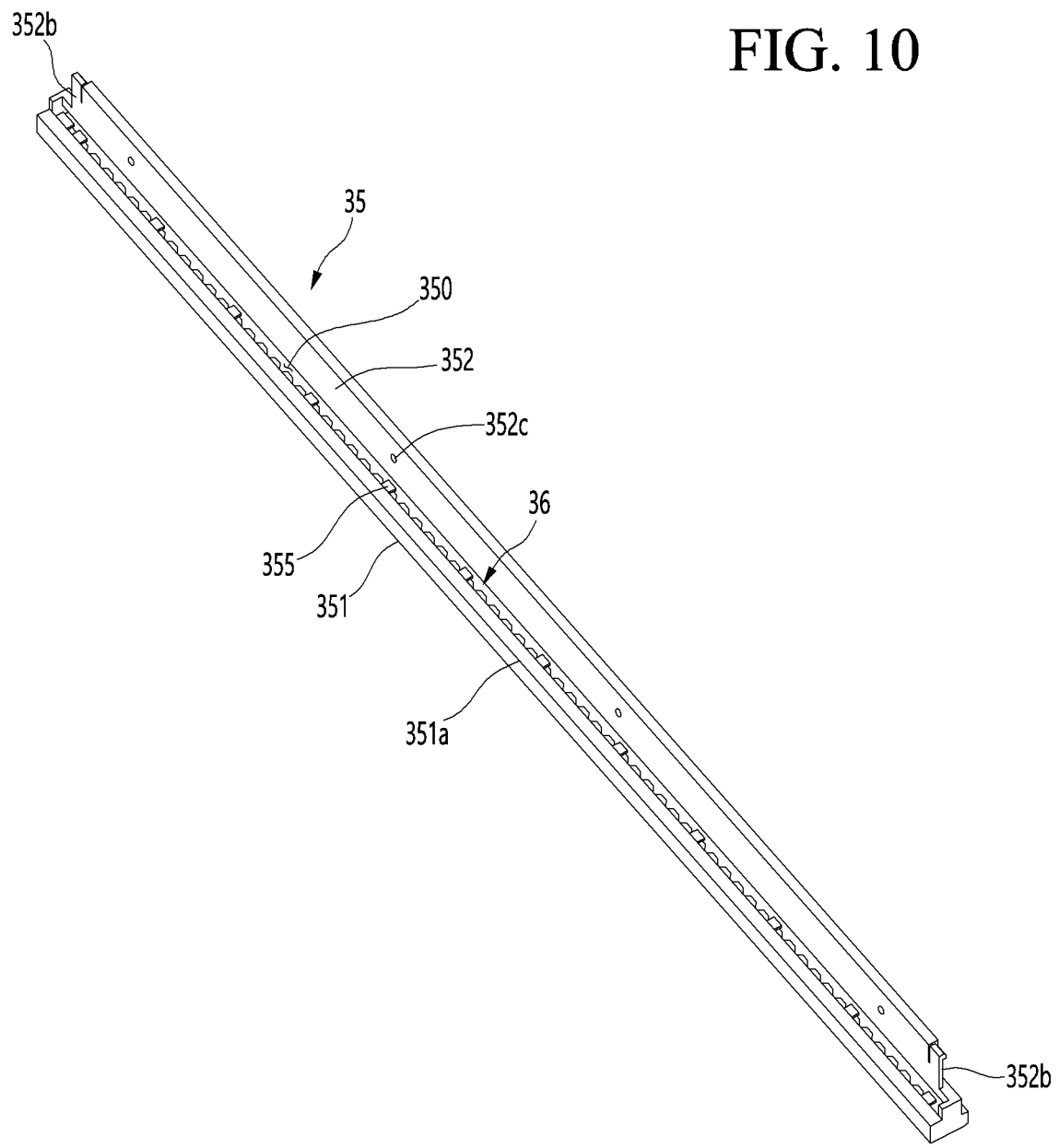
FIG. 10 is a perspective view illustrating a state in which the lighting device is mounted on the lower bracket that is one component of the panel assembly.
Figure 11:
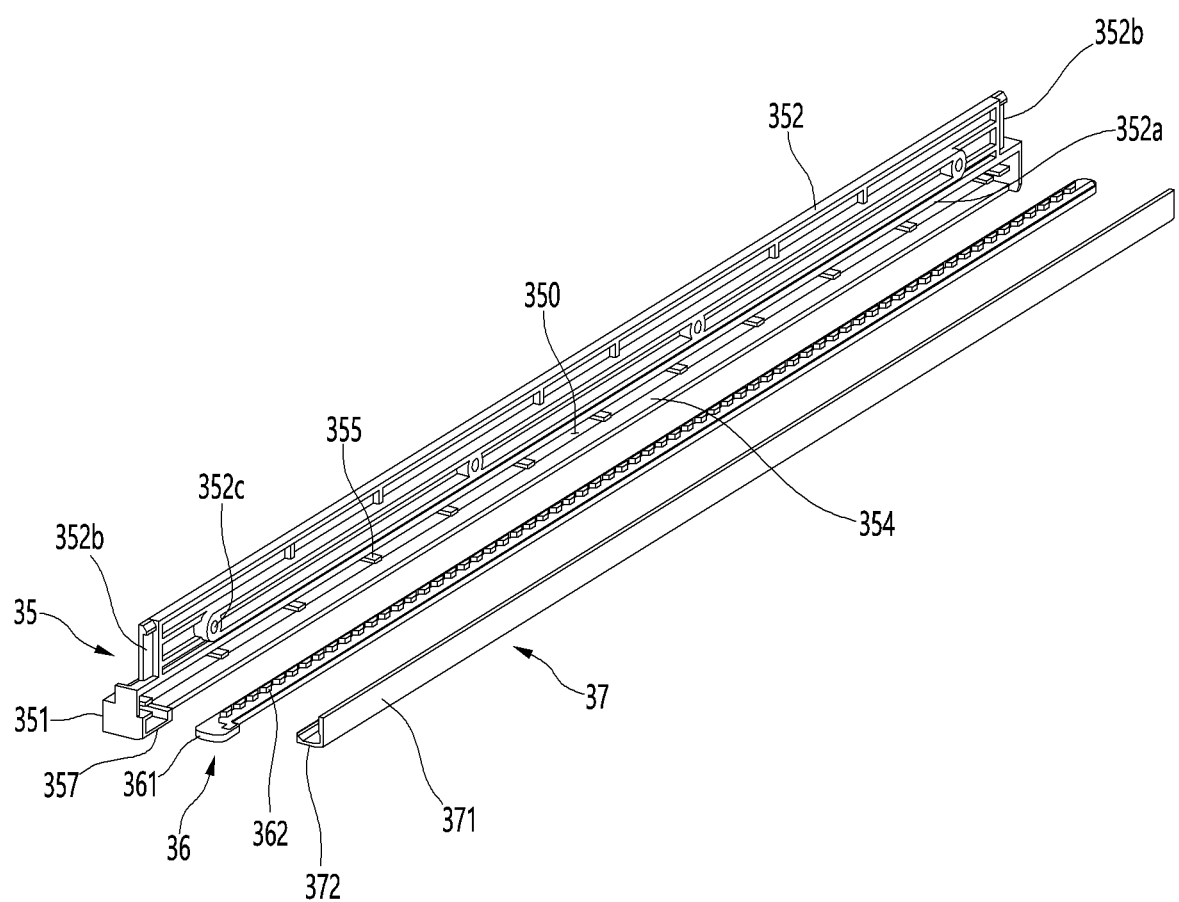
FIG. 11 is an exploded perspective view illustrating the lower bracket, a lighting device, and a heat dissipation member.
Figure 12:
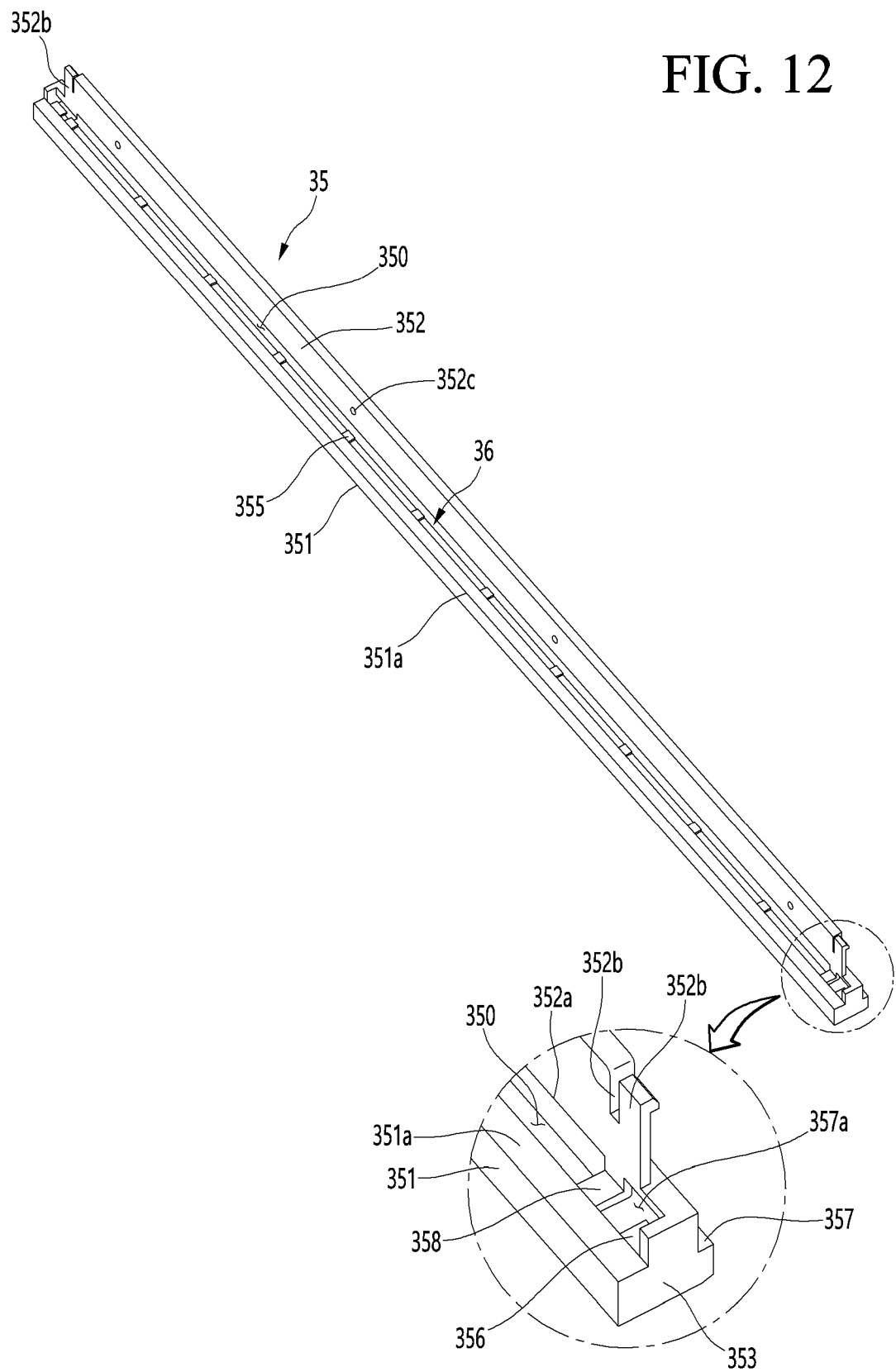
FIG. 12 is a perspective view of the lower bracket.

FIG. 10 is a perspective view illustrating a state in which the lighting device is mounted on the lower bracket that is one component of the panel assembly. In addition, FIG. 11 is an exploded perspective view illustrating the lower bracket, the lighting device, and the heat dissipation member. FIG. 12 is a perspective view of the lower bracket.

As illustrated in the drawings, the lower bracket 35 may have a corresponding to the right and left direction length of the panel assembly 30. The lower bracket 35 may broadly include the lower bracket front surface portion (or lower bracket front surface) 351, a lower bracket rear surface portion (or lower bracket rear surface) 352, a lower bracket side surface portion (or lower bracket side surface) 353, and a lower bracket bottom surface portion (or lower bracket bottom surface) 354.

The lower bracket front surface portion 351 may define a shape of the front surface of the lower bracket 35, and a panel support portion 351a may be disposed on the upper end of the lower bracket front surface portion 351 to define the lower end of the panel 31. That is, the panel support portion 351a may protrude more upward than an upper end of a light source of the lighting device 36 and may protrude to a set height to prevent the lighting device 36, i.e., an LED 362 from being exposed forward. The panel support portion 351a may hide an area generated due to intensive light irradiation at the lower end of the light guide plate 33 and the lower end of the panel 31, which are disposed more adjacent to the lighting device 36, to prevent a lighting spot from being formed on the panel 31.

The lower bracket rear surface portion 352 may define a rear surface of the lower bracket 35 and may protrude more upward than the lower bracket front surface portion 351 and the lower bracket side surface portion 353 to support the light guide plate 33 at the rear side and then may be coupled to the back cover 39.

A lower bracket mounting portion 352b that is disposed to be stepped forward may be disposed on each of both left and right ends of the lower bracket rear surface portion 352. The lower bracket mounting portion 352b may be inserted and mounted into the side surface portion 322. One end of the lower bracket mounting portion 352b may be cut off, and an end of the lower bracket mounting portion 352b may be provided in a hook shape to be hooked and restricted in an inner space of the side surface portion 322 when the lower bracket 35 is mounted. A lower bracket screw hole 352c to which a plurality of screws 397b are coupled may be defined in the lower bracket rear surface portion 352.

A bracket opening may be defined in the lower bracket rear surface portion 352. The bracket opening 352a may be defined at a position facing the lower bracket front surface portion 351 and may be defined to be opened in the rear surface of an accommodation space 350 in which the lighting device 36 is mounted. In addition, the lighting device 36 may be accessible through the bracket opening 352a. The bracket opening 352a may be shielded by the back cover 39.

The lower bracket bottom surface portion 354 may define a bottom surface of the lower bracket 35 and may define a bottom surface of the space in which the lighting device 36 is mounted. A light guide plate support portion (or light guide plate supports) 355 protruding rearward may be disposed on the lower bracket front surface portion 351. The plurality of light guide plate supports 355 may protrude backward at a constant interval along the lower bracket front surface portion 351. In addition, a top surface of the light guide plate support portion 355 may support a lower end of the light guide plate 33.

The light guide plate support portion 355 may extend to restrict the lighting device 36 at the upper side. The light guide plate support portion 355 may extend backward while passing between the plurality of LEDs 362 disposed on the lighting device 36 and may be in contact with a top surface of the substrate 361 of the lighting device 36.

In addition, a substrate support portion protrusion (reference numeral 354a in FIG. 20) protruding upward may be disposed on the lower bracket bottom surface portion 354. The substrate support portion protrusion 354a may be in contact with the bottom surface of the substrate 361. Thus, the top and bottom surfaces of the lighting device 36 may be restricted by the light guide plate support portion 355 and the substrate support portion protrusion 354a, and vertical movement of the lighting device 36 may be restricted.

The lighting device 36 may be provided within the lower bracket 35. The lighting device 36 may include a substrate 361 and an LED 362. The substrate 361 may be formed in a plate shape to be accommodated within the lower bracket 35 and may extend from one end of the lower bracket 35 to the other end. The plurality of LEDs 362 may be continuously disposed at a predetermined interval on the substrate 361.

In addition, a protrusion guide 357 may be disposed on one end of both the left and right ends of the lower bracket 35. The protrusion guide 357 may be configured to so that a portion of the substrate 361 of the lighting device 36 disposed inside the lower bracket 35 is exposed, and the wire 369 may be connected to the substrate 361 through the protrusion guide 357.

The protrusion guide 357 may be disposed on one end that is far from a rotation shaft of the door 20 among both the left and right ends and may protrude more backward than the lower bracket rear portion 352. In addition, the protrusion guide 357 may have an opening 357a defined in a rear surface of the protrusion guide 357. In addition, the substrate protrusion 361b may be exposed through the opening 357a. A space inside the protrusion guide 357 may communicate with the accommodation space 350.

In addition, a lower support portion 359 supporting one end of the substrate 361, on which the substrate protrusion 361b is disposed, from the lower side may be disposed to protrude from the inside of the protrusion guide 357. In addition, an upper support portion 358 extending below an upper end of the bracket opening 352a and supporting the top surface of the substrate 361 on which the substrate protrusion 361b is disposed may be provided. One end of the substrate 361 on which the substrate protrusion 361b is disposed may have top and bottom surfaces that are stably supported by the upper support portion 358 and the lower support portion 359, and thus, when the wire 369 is connected to the substrate 361, the substrate 361 may be prevented from moving or being separated from the mounted position.

The heat dissipation member 37 may be provided within the lower bracket 35. The heat dissipation member 37 may support the lighting device 36 within the lower bracket 35. In addition, the heat dissipation member 37 may be made of a metal material to dissipate heat generated by the lighting device 36 by conduction and may be provided in a size that is enough to be accessible through the bracket opening 352a.

The heat dissipation member 37 may include a first supporting portion 372 supporting the lighting device 36 and a second supporting portion 371 that is in contact with the back cover 39. The first supporting portion 372 may be disposed on the lower bracket bottom surface portion 354 within the lower bracket 35. The second supporting portion 371 may extend upward from a rear end of the first supporting portion 372 and be exposed backward through the bracket opening 352a so that when the back cover 39 is mounted, the second supporting portion 371 is in contact with the back cover 39. Thus, the heat generated by the lighting device 36 may be transferred to the back cover 39 through the heat dissipation member 37 so as to be dissipated.

Figure 13:
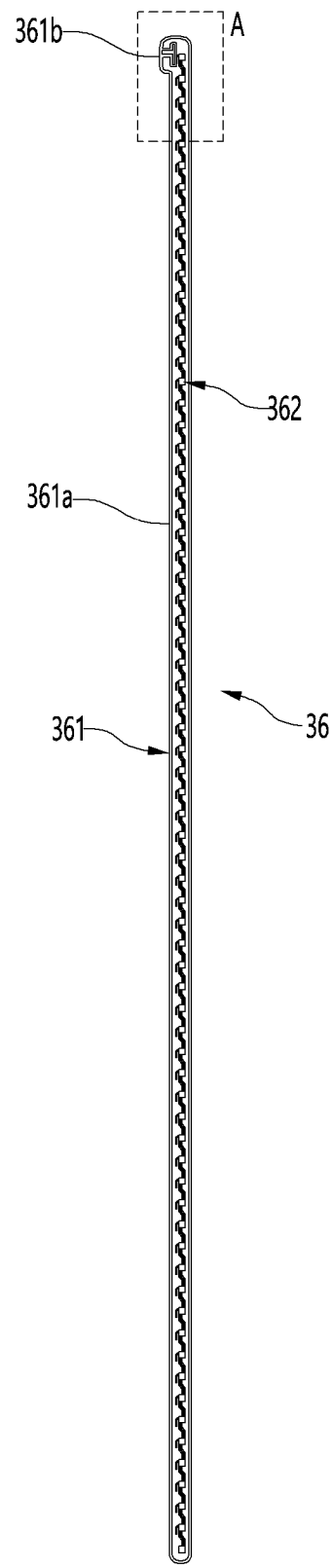
FIG. 13 is a plan view of the lighting device.
Figure 14:
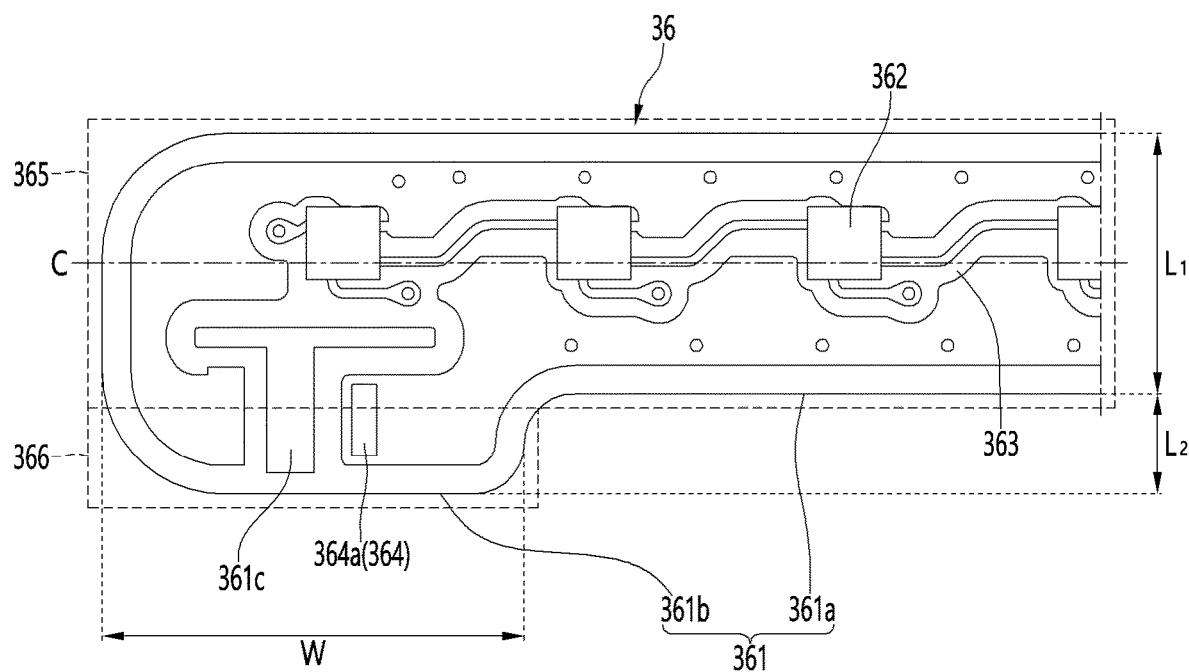
FIG. 14 is an enlarged view illustrating a portion A of FIG. 13.
Figure 15:
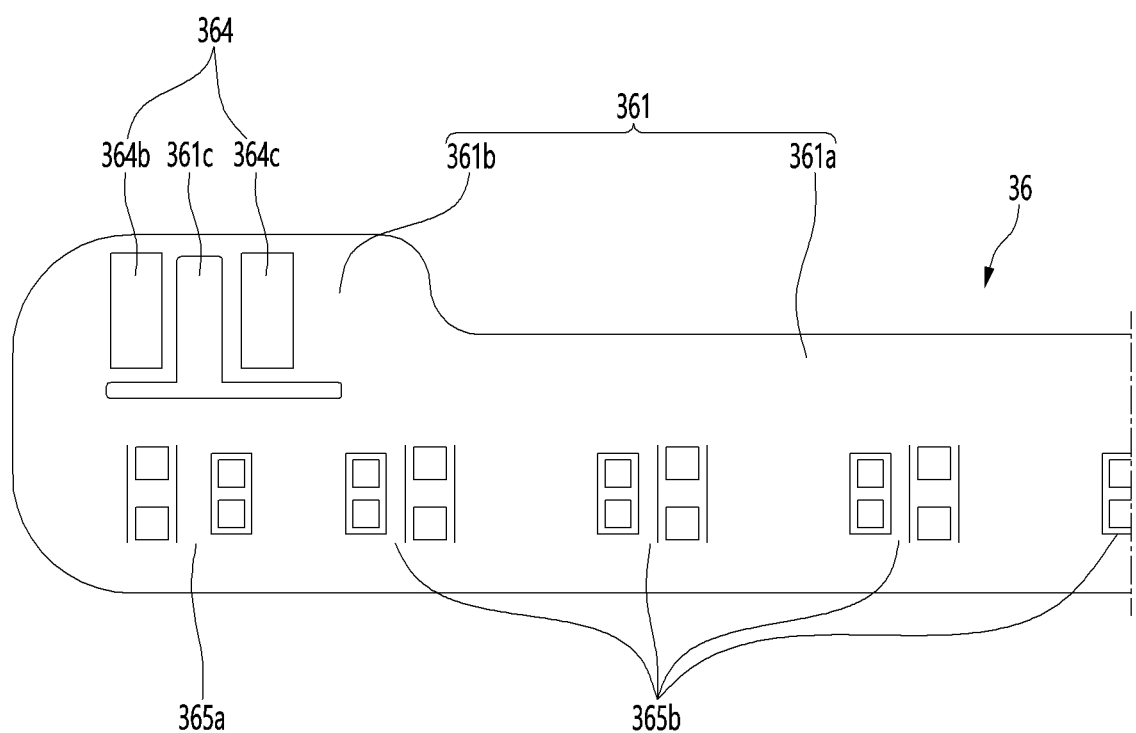
FIG. 15 is an enlarged view illustrating an opposite surface of the portion A.

Hereinafter a structure of the lighting device 36 will be described in more detail with reference to the drawings. FIG. 13 is a plan view of the lighting device. Also, FIG. 14 is an enlarged view illustrating a portion A of FIG. 13. Also, FIG. 15 is an enlarged view illustrating an opposite surface of the portion A.

As illustrated in the drawings, the lighting device may include a plate-shaped substrate and a plurality of LEDs disposed along the substrate. The substrate 361 may have a length corresponding to a horizontal length of the light guide plate 33 or a length slightly greater than that of the light guide plate 33 and may have a size corresponding to that of the accommodation space 350 of the lower bracket 35. Thus, the LEDs 362 may be disposed along an end of the light guide plate 33 to sufficiently irradiate light to both the ends of the light guide plate 33.

In detail, the LEDs 362 may be disposed to irradiate light toward the lower end of the light guide plate 33. The LEDs 362 may provide a space in which the LEDs 362 are continuously disposed from a left end to the other end of the light guide plate 33. In addition, the left side end and the right side end of the substrate 361 may be in contact with the lower bracket side surface portion 353 within the lower bracket 35 and may restrict right and left movement.

Each of the LEDs 362 may be configured as an RGB LED, for example. The LED 362 may include an RGB LED for irradiating light with various colors under a control of the controller 13. That is, the LED 362 may irradiate light with various colors by combining the colors of the irradiated light under the control of the controller 13, and thus, the panel 31 may shine with various colors set by the controller 13. According to color of the panel 31, a color of the outer appearance of the front surface of the refrigerator 1 may be determined.

The LED 362 may include an LED irradiating light with a specific color other than the RGB LED and may include a combination of a plurality of LEDs that irradiate light with different colors. In addition, in the light device, other light sources capable of performing the same operation in addition to the LED 362 may be disposed.

The LED 362 may be mounted at a constant interval on the substrate 361, and the appropriate number of light sources 362 may be arranged to allow the panel 31 to shine with set brightness. For example, the LED 362 may be arranged at an interval of about 6.3 mm to about 7.0 mm, brightness thereof may reach target brightness of the panel 31, and the entire surface of the panel 31 may shine with uniform brightness equal to or greater than about 80%. An interval between the LED 362 may be less than the right and left width of the light guide plate support portion 355, and thus the light guide plate support portion 355 may be disposed between the light sources 362.

When looking at the structure of the substrate 361 in more detail, the substrate 361 may include an LED mounting portion (or LED mounting region) 361a, on which the LED 362 is mounted, and a substrate protrusion 361b on which a soldering portion 364, to which a wire 369 for an operation of the LED 362 is connected, is disposed. That is, the substrate 361 may extend to be elongated in the horizontal direction to mount the plurality of LEDs 362 thereon, and one side of the substrate 361 may have a shape protruding backward. Due to such a shape, the LED mounting portion 361a may be disposed inside the panel assembly 30, and the substrate protrusion 361b may have a structure that protrudes to pass through the rear surface of the panel assembly 30, thereby minimizing 35hicken35hickenss of the panel assembly 30.

The plurality of LEDs 362 may be mounted on the LED mounting portion 361a, and the LED mounting portion 361a may extend to be elongated with the same length L1 in the front and rear direction along the extension direction. Here, the length L1 of the LED mounting portion 361a in the front and rear direction may have a size less than a distance D1 between the front surface of the panel 31 and the back cover 39. In addition, the length L1 of the LED mounting portion 361a in the front and rear direction may be determined to be a minimum length required for arranging the LEDs 362.

In addition, the LED mounting portion 361a may have an emission area 365 on which the plurality of the LEDs 362 are disposed. The emission area 365 may correspond to an entire top surface of the LED mounting portion 361a, and the plurality of LEDs 362 may be arranged in a line on the emission area 365. The emission area 365 may be referred to as a first substrate area.

Only the LEDs 362 may be disposed within the emission area 365, and thus, the LEDs 362 may be sequentially disposed from both left and right ends of the LED mounting portion 361a. In the emission area 365, a soldering portion 364 or other elements 365a and 365b other than the LEDs 362 may not be disposed, and the LEDs 362 may be densely disposed. Particularly, the LEDs 362 may be disposed adjacent as possible to both left and right ends of the emission area 365, i.e., to both left and right ends of the LED mounting portion 361a, and thus, sufficient light may be irradiated up to both the left and right ends of the light guide plate 33 to prevent both the ends of the panel 31 from being darkened. Particularly, this arrangement of the LED 362 may be possible by disposing the soldering portion 364 connected to the wire 369 on the substrate 361 outside the emission area 365, and the soldering portion 364 may be disposed on the substrate protrusion 361b protruding from the substrate 361.

In addition, the LED 362 may be disposed on the top surface of the substrate 361, and an LED element 365b for driving the LED 362 and elements 365a for inputting a signal may be disposed on the bottom surface of the substrate 361. Thus, in the emission area 365, no other configuration other than the LED 362 and the circuit 363 connected to the LEDs 362 may be disposed.

That is, the LED element 365b for driving the LED 362 and the element 365a for the signal processing may be disposed on a bottom surface of the LED mounting portion 361a. Due to this arrangement, while minimizing the length L1 of the LED mounting portion 361a in the front and rear direction, the LED 362 may be protected against noise, overvoltage, or static electricity, which are caused by the elements 365a and 365b.

The LED 362 may be disposed at a somewhat eccentric position at a midpoint of the LED mounting portion 361a. In detail, the LED 362 may be disposed more forward than a center line C of the midpoint of the LED mounting portion 361a in the front and rear direction. For example, the midpoint of the LED 362 in the front and rear direction may be disposed more forward than the center line C.

Due to this arrangement, the LED 362 may be disposed vertically below the light guide plate 33, and light may be effectively irradiated to the lower end of the light guide plate 33. In addition, the LED 362 may be disposed adjacent to the lower bracket front surface portion 351 to prevent the lower end of the panel 31 from being excessively bright by the light irradiated from the LED 362 or prevent hot spots or light leaks in which light is condensed at the lower end of the panel 31 from occurring.

The substrate protrusion 361b may protrude backward from one end of both the left and right ends of the substrate 361. The substrate protrusion 361b may protrude backward from an end of the LED mounting portion 361a.

The substrate protrusion 361b may provide a terminal area 366 on which the soldering portion 364 for the connection of the wire 369 is disposed. The substrate protrusion 361b may protrude so that the soldering portion 364 extending in the front and rear direction is disposed. That is, the plurality of soldering portions 364 may be disposed inside the terminal area 366. The terminal area 366 may be referred to as a second substrate area to be distinguished from the first substrate area.

The soldering portion 364 may be a portion connected to the wire 369 and be configured to supply power or transmit a signal to the substrate 361 and also be configured so that a plurality of wires 369 are connected by soldering. The soldering portion 364 may extend in the front and rear direction to facilitate the connection of the wire 369. Of course, the wire 369 may be connected in other manners, and in this case, the soldering portion 364 may be expressed as a terminal portion or a connection portion.

A length L2 of the substrate protrusion 361b in the front and rear direction may be provided so that the soldering portion 364 is disposed and also is accommodated inside the protrusion guide 357. For example, the length L2 of the substrate protrusion 361b in the front and rear direction may be less than the length L1 of the LED mounting portion in the front and rear direction.

In addition, a width W of the substrate protrusion 361b in the left and right direction may have a size that is enough so that all of the plurality of soldering portions 364 are disposed. To minimize the width W of the substrate protrusion 361b in the left and right direction, the plurality of soldering portions 364 may extend in the front and rear direction and may be separately disposed on the top and bottom surfaces of the substrate protrusion 361b.

For example, a ground soldering portion 364a connected to a ground line 369a may be disposed on the top surface of the substrate protrusion 361b. The ground soldering portion 364a may be disposed on the top surface of the substrate protrusion 361b because a ground line 369a capable of being independently disposed is connected. In addition, a power soldering portion 364c connected to a power line 369c and a signal soldering portion 364b spaced apart from the power soldering portion 364c and connected to a signal line 369b may be disposed on the bottom surface of the substrate protrusion 361b.

Here, the signal soldering portion 364b may be disposed closer to the side end of the substrate 361 than the power soldering portion 364c. An element 365a for processing a signal may be disposed on the bottom surface of the substrate 361 at the outermost side of the LED mounting portion 361a, and thus, the signal soldering portion 364b to be connected to the element 365a may be disposed outside the substrate 361 rather than the power soldering portion 364c so as to be disposed closer to the element 365a. Of course, the positions of the soldering portions 364 are not limited thereto, and the soldering portions may be disposed to be distributed on the top and bottom surfaces of the substrate protrusion 361*b* so that a required size of the terminal area 366 is minimized, and a width W of the substrate protrusion 361*b* in the left and right direction is minimized.

A slit 361*c* passing through the substrate 361 may be defined in the substrate protrusion 361*b*. The slit 361*c* may be defined between the soldering portions 364 and may physically separate the adjacent soldering portions 364 from each other to prevent electrodes from being electrically short-circuited. For example, the soldering portion 364 may be disposed between the power soldering portion 364*c* and the signal soldering portion 364*b* and may be further disposed along between the soldering portion 364 and the LED 362.

As illustrated in FIG. 14, the emission area 365 of the LED mounting portion 361*a* and the terminal area 366 of the substrate protrusion 361*b* may be disposed in parallel with each other. That is, the emission area 365 and the terminal area 366 may be disposed independently of each other and may be disposed in two rows side by side. Thus, the length L1 of the emission area 365 in the front and rear direction may be minimized, and both the ends of the emission area 365 may be disposed to be closest to both the left and right ends of the light guide plate 33 so as to shine brightly up to both the ends of the light guide plate 33 and the panel 31.

The emission area 365 and the terminal area 366 may be disposed side by side and at least partially overlap with each other in the extending direction of the LED mounting portion 361*a*. That is, one end of the emission area 365 and the terminal area 366 may be disposed at the same position as the one end of the substrate 361 to extend in the same direction. Thus, a portion of the emission area 365 and the terminal area 366 may be disposed on the same area in the extending direction of the substrate 361 as much as the width W of the terminal area 366 in the substrate 361.

In addition, the LED 362 disposed at the outermost of the plurality of the LEDs 362 may be disposed side by side to overlap at least one of the soldering portions 364 of the substrate protrusion 361*b* within the substrate 361. The substrate 361 may have various structures according to other examples in addition to the above-described structure.

Figure 16:
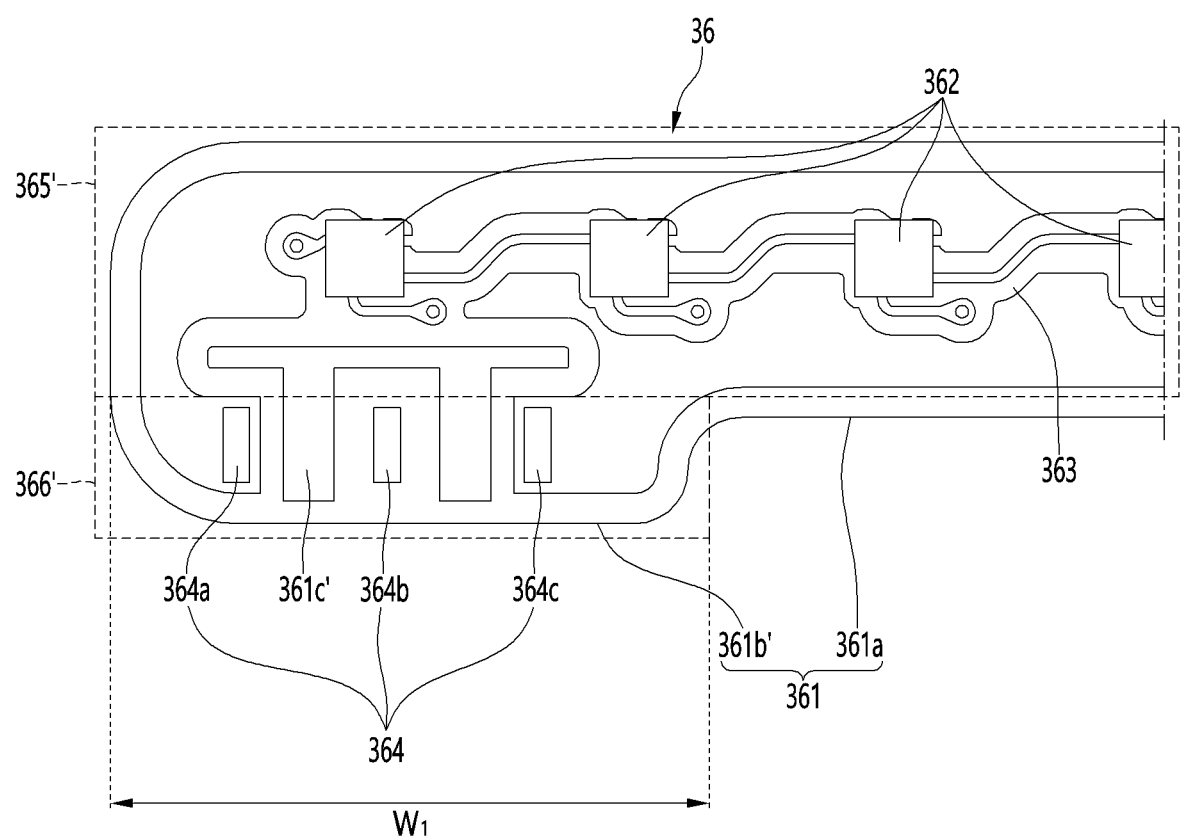
FIG. 16 is a partial enlarged view illustrating another example of the lighting device.

Hereinafter, another example of the lighting device will be described, and the same reference numerals will be used for the same components as those of the above-described example, and a detailed description thereof will be omitted. FIG. 16 is a partial enlarged view illustrating another example of the lighting device.

As illustrated in the drawing, a lighting device 36 according to another embodiment may include a substrate 361 and an LED 362. In addition, the substrate 361 may include an LED mounting portion 361*a*, on which a plurality of LEDs 362 are continuously disposed, and a substrate protrusion 361*b'* on which a soldering portion 364 is disposed. An emission area 365' providing a space in which the plurality of LEDs 362 are disposed may be provided on the LED mounting portion 361*a*, and a terminal area 366' defining a space in which the soldering portion 364 is disposed may be provided on the substrate protrusion 361*b'*.

The emission area 365' and the terminal area 366' may be disposed in parallel with each other or may be independently disposed. In addition, the emission area 365' and the terminal area 366' may have an arrangement structure in which at least a portion overlaps an entire substrate 361.

The structure of the LED mounting portion 361*a* may be the same as the structure of the LED mounting portion 361*a* in FIGS. 13 to 15 described above except for only the structure of the substrate protrusion 361*b'*. In detail, a ground soldering portion 364*a*, a power soldering portion 364*c*, and a signal soldering portion 364*b* may be disposed on the substrate protrusion 361*b'*. All the ground soldering portion 364*a*, the power soldering portion 364*c*, and the signal soldering portion 364*b* may be disposed on a top surface of the substrate protrusion 361*b'* to extend in the front and rear direction The ground soldering portion 364*a*, the signal soldering portion 364*b*, and the power soldering portion 364*c* may be spaced apart from each other, and a slit 361*c'* may be defined between the ground soldering portion 364*a*, the signal soldering portion 364*b*, and the power soldering portion 364*c*. The slit 361*c'* may be defined between the ground soldering portion 364*a* and the signal soldering portion 364*b*, and between the signal soldering portion 364*b* and the power soldering portion 364*c*, and also may be disposed between the whole of the plurality of soldering portions 364 and the LED 362.

The substrate protrusion 361*b'* may be disposed so that all the plurality of soldering portions 364 and the slit 361*c'* are provided. Thus, a width W1 of the substrate protrusion 361*b'* in the left and right direction may be slightly greater than the width W of the substrate protrusion 361*b*, which is illustrated in FIGS. 13 to 15, in the left and right direction. The lighting device may have various other examples in addition to the above-described structures.

Figure 17:
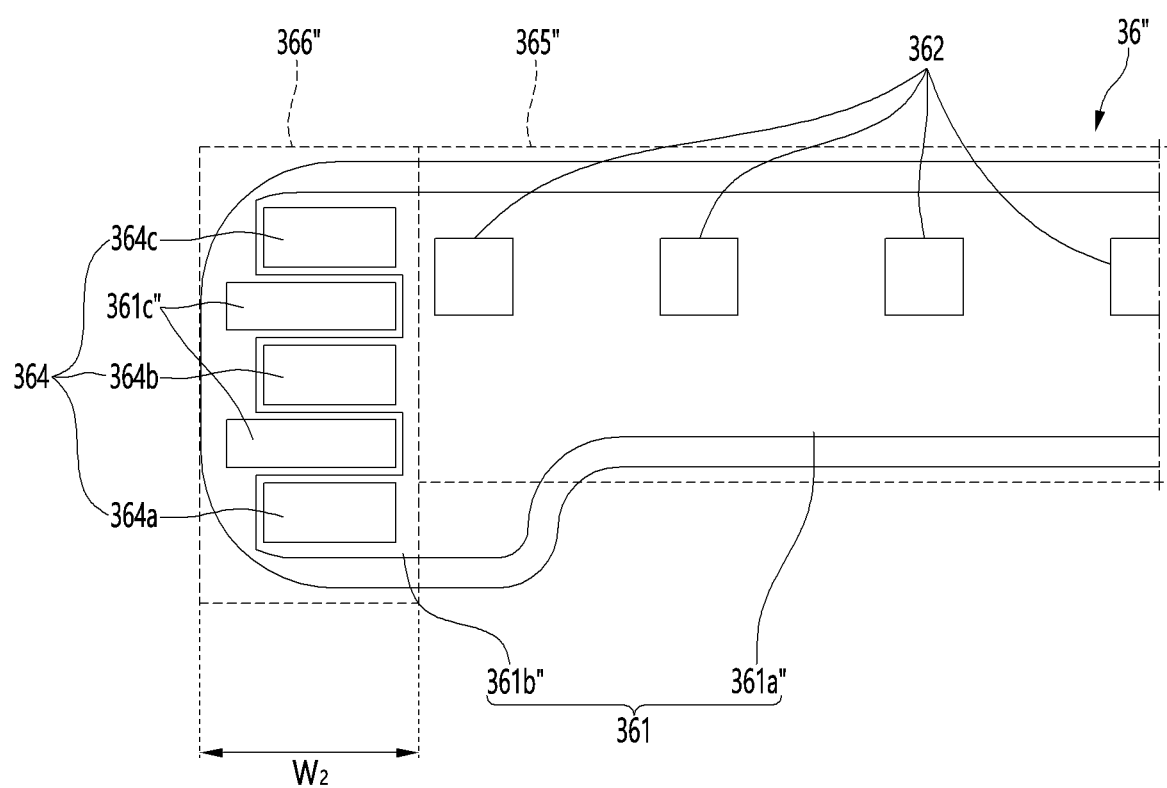
FIG. 17 is a partial enlarged view illustrating further another example of the lighting device.

Hereinafter, further another example of the lighting device will be described, and the same reference numerals will be used for the same components as those of the above-described examples, and a detailed description thereof will be omitted. FIG. 17 is a partial enlarged view illustrating further another example of the lighting device.

As illustrated in the drawing, a lighting device 36 according to further another embodiment may include a substrate 361 and an LED 362. In addition, the substrate 361 may include an LED mounting portion 361*a"*, on which a plurality of LEDs 362 are continuously disposed, and a substrate protrusion 361*b"* on which a soldering portion 364 is disposed. An emission area 365" providing a space in which the plurality of LEDs 362 are disposed may be provided on the LED mounting portion 361*a"*, and a terminal area 366" defining a space in which the soldering portion 364 is disposed may be provided on the substrate protrusion 361*b"*.

The emission area 365" and the terminal area 366" may be disposed in series with each other and may have an independently disposed arrangement structure. In detail, a plurality of LEDs 362 may be continuously disposed on the LED mounting portion 361*a"*. In addition, the emission area 365" for continuously disposing the plurality of LEDs 362 may be defined on the LED mounting portion 361*a"*. Here, the LEDs 362 may be disposed on a top surface of the LED mounting portion 361*a"* and may be disposed at a position more eccentric forward than a central part of the "D mounting portion 361*a"*". In addition, only the LED 362 may be disposed on the top surface of the LED mounting portion 361*a"*, and although not shown, elements for driving the LED 362 may be disposed on a bottom surface of the substrate 361.

The substrate protrusion 361*b"* may protrude laterally from one end of the LED mounting portion 361*a"*. In addition, a ground soldering portion 364*a*, a signal soldering portion, and a power soldering portion 364*c* may be spaced apart from each other in the front and rear direction on the substrate protrusion 361*b"*. All the ground soldering portion 364*a*, the signal soldering portion 364*b*, and the power soldering portion 364*c* may be disposed on a top surface of the substrate protrusion 361*b"* to extend in the left and right direction.

The ground soldering portion 364a, the signal soldering portion 364b, and the power soldering portion 364c may be spaced apart from each other, and a slit 361c" may be defined between the ground soldering portion 364a, the signal soldering portion 364b, and the power soldering portion 364c. The slit 361c" may be defined between the ground soldering portion 364a and the signal soldering portion 364b, and between the signal soldering portion 364b and the power soldering portion 364c, and also may be disposed between the whole of the plurality of soldering portions 364 and the LED 362.

The substrate protrusion 361b" may be disposed so that all the plurality of soldering portions 364 and the slit 361c" are provided. Here, since the soldering portions 364 extend in the left and right direction and are spaced apart in the front and rear direction, a width W2 of the substrate protrusion 361b" in the left and right direction may be minimized.

Thus, the width W2 of the substrate protrusion 361b" in the left and right direction may be slightly less than the width W of the substrate protrusion 361b, which is illustrated in FIGS. 13 to 15, in the left and right direction and the width W1 of the substrate protrusion 361b', which is illustrated in FIG. 16.

Of course, if necessary, some of the soldering portions 364 may be disposed on the top surface of the substrate protrusion 361b", and other portions may be disposed on the bottom surface of the substrate protrusion 361b". With such a structure, the emission area 365" and the terminal area 366" may be continuously disposed in the extending direction of the substrate 361. In addition, the emission area 365" and the terminal area 366" may be disposed side by side to at least partially overlap each other with respect to the front and rear direction. The lighting device may have various other examples in addition to the above-described structures.

Figure 18:
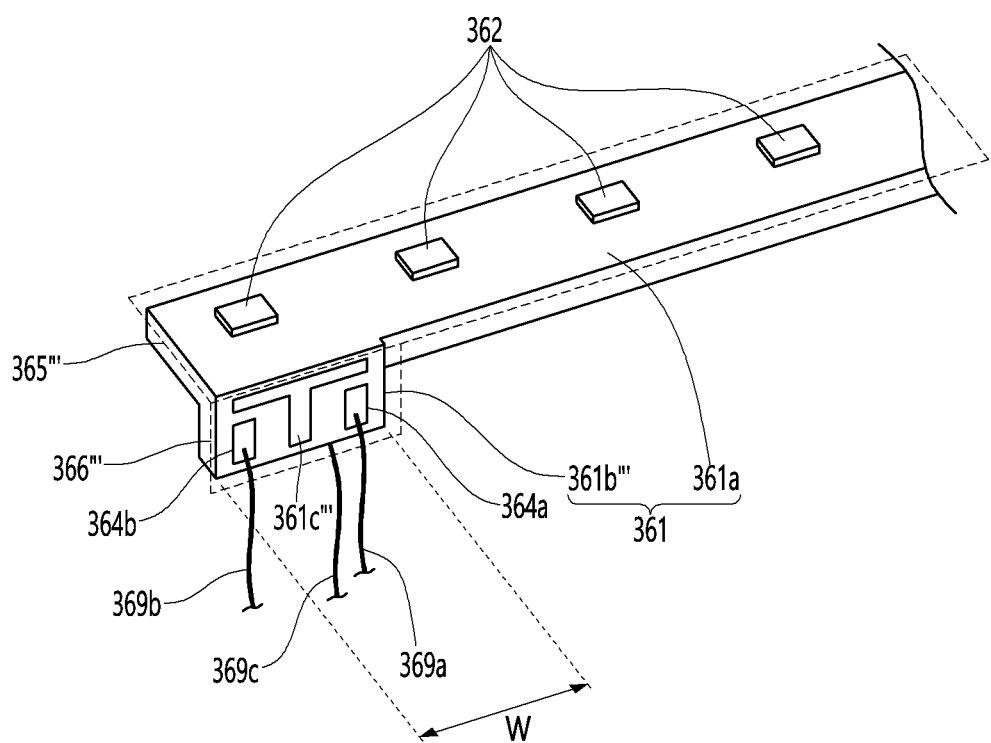
FIG. 18 is a partial enlarged view illustrating further another example of the lighting device.

Hereinafter, further another example of the lighting device will be described, and the same reference numerals will be used for the same components as those of the above-described examples, and a detailed description thereof will be omitted. FIG. 18 is a partial enlarged view illustrating further another example of the lighting device.

As illustrated in the drawing, a lighting device 36 according to another embodiment may include a substrate 361 and an LED 362. In addition, the substrate 361 may include an LED mounting portion 361a, on which a plurality of LEDs 362 are continuously disposed, and a substrate protrusion 361b''' on which a soldering portion 364 is disposed. An emission area 365''' providing a space in which the plurality of LEDs 362 are disposed may be provided on the LED mounting portion 361a, and a terminal area 366''' defining a space in which the soldering portion 364 is disposed may be provided on the substrate protrusion 361b'''.

The emission area 365''' and the terminal area 366''' may be disposed in parallel with each other or may be independently disposed. In addition, the emission area 365''' and the terminal area 366''' may have an arrangement structure in which at least a portion overlaps an entire substrate 361.

The structure of the LED mounting portion 361a may be the same as the structure of the LED mounting portion 361a in FIGS. 13 to 15 described above except for only the structure of the substrate protrusion 361b'''. In detail, the substrate protrusion 361b''' may have a structure extending downward from a rear end of the LED mounting portion 361a. That is, the substrate protrusion 361b''' may protrude downward with respect to the LED mounting portion 361a. In addition, due to the arrangement structure in which the substrate protrusion 361b''' extends downward, the terminal area 366''' may also be disposed in a direction crossing the emission area 365'''.

A ground soldering portion 364a connected to the ground line 369a, a signal soldering portion 364b connected to the signal line 369b, and a power soldering portion 364c connected to the power supply line 369c may be disposed on the substrate protrusion 361b'''. The ground soldering portion 364a and the signal soldering portion 364b may be disposed on a rear surface of the substrate protrusion 361b''' to extend in the vertical direction.

In addition, the ground soldering portion 364a and the signal soldering portion 364b may be spaced apart from each other, and a slit 361c''' may be defined between the ground soldering portion 364a and the signal soldering portion 364b. The slit 361c''' may be defined between the ground soldering portion 364a and the signal soldering portion 364b and may also be defined between upper ends of the ground soldering portion 364a and the signal soldering portion 364b and the LED 362.

In addition, the power soldering portion 364c may be disposed on an entire surface of the substrate protrusion 361b'''. Thus, the soldering portion 364 may be dispersedly disposed on front and rear surfaces of the substrate protrusion 361b''' to minimize a width W of the substrate protrusion 361b''' in the left and right direction.

Figure 19:
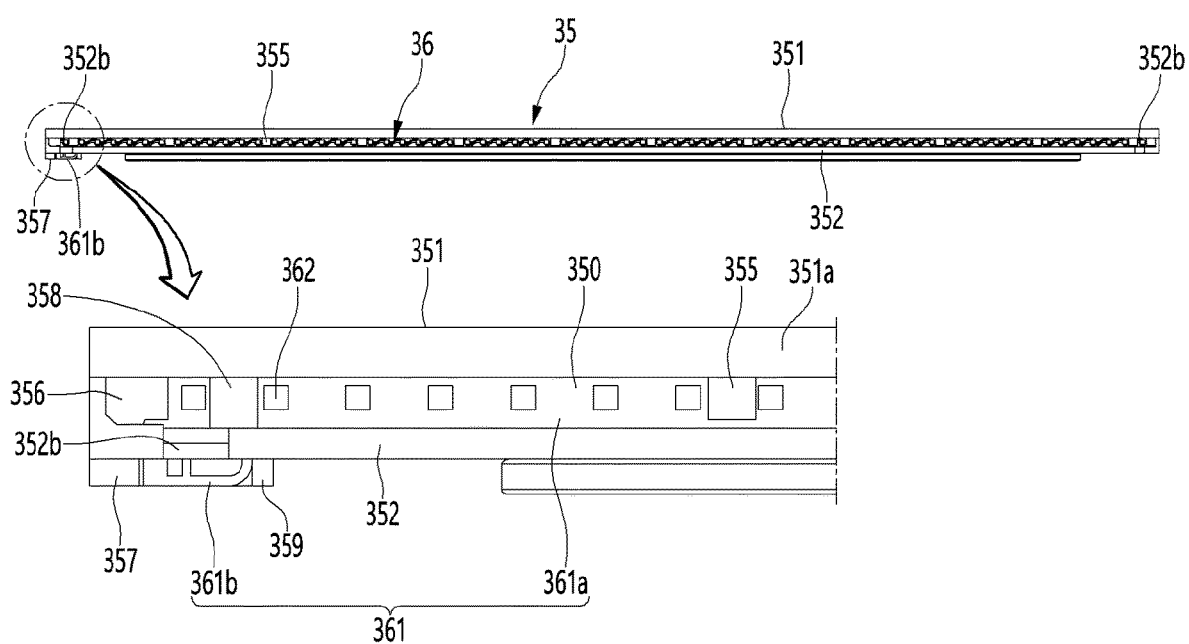
FIG. 19 is a plan view illustrating a state in which the lighting device is mounted on the door bracket.
Figure 20:
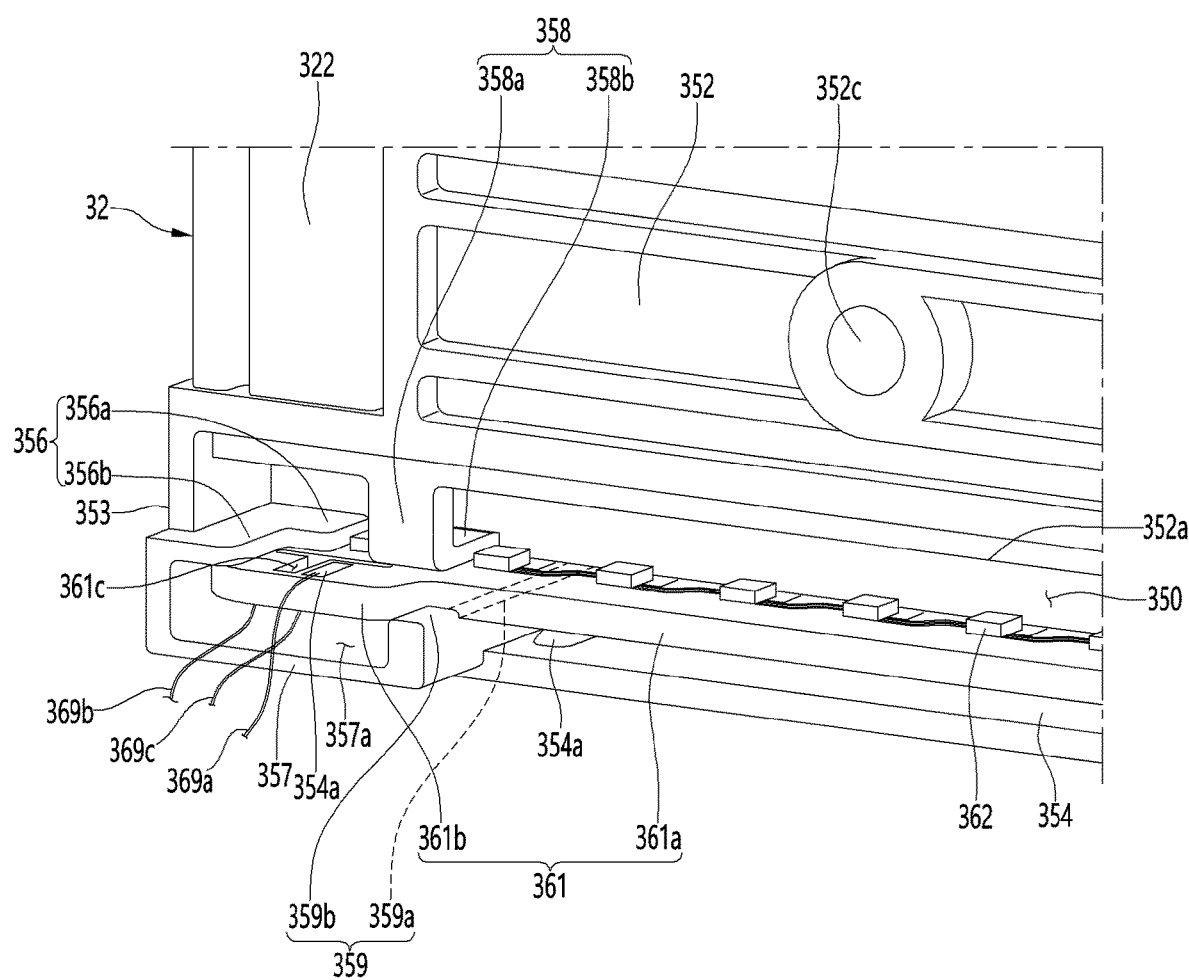
FIG. 20 is a partial enlarged view illustrating a mounting state of the lighting device.
Figure 21:
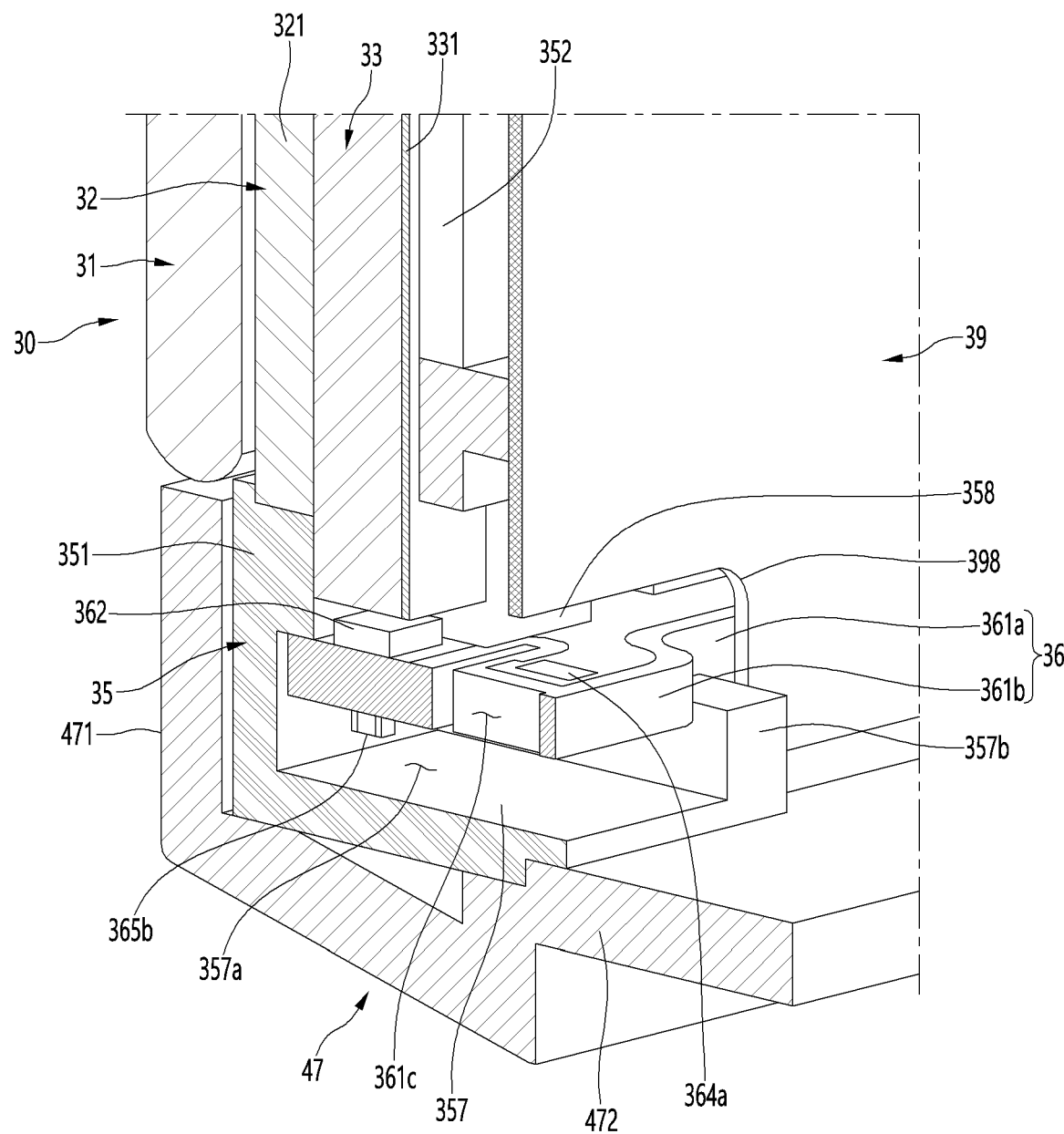
FIG. 21 is a cutaway perspective view taken along line XXI-XXI' of FIG. 4.
Figure 22:
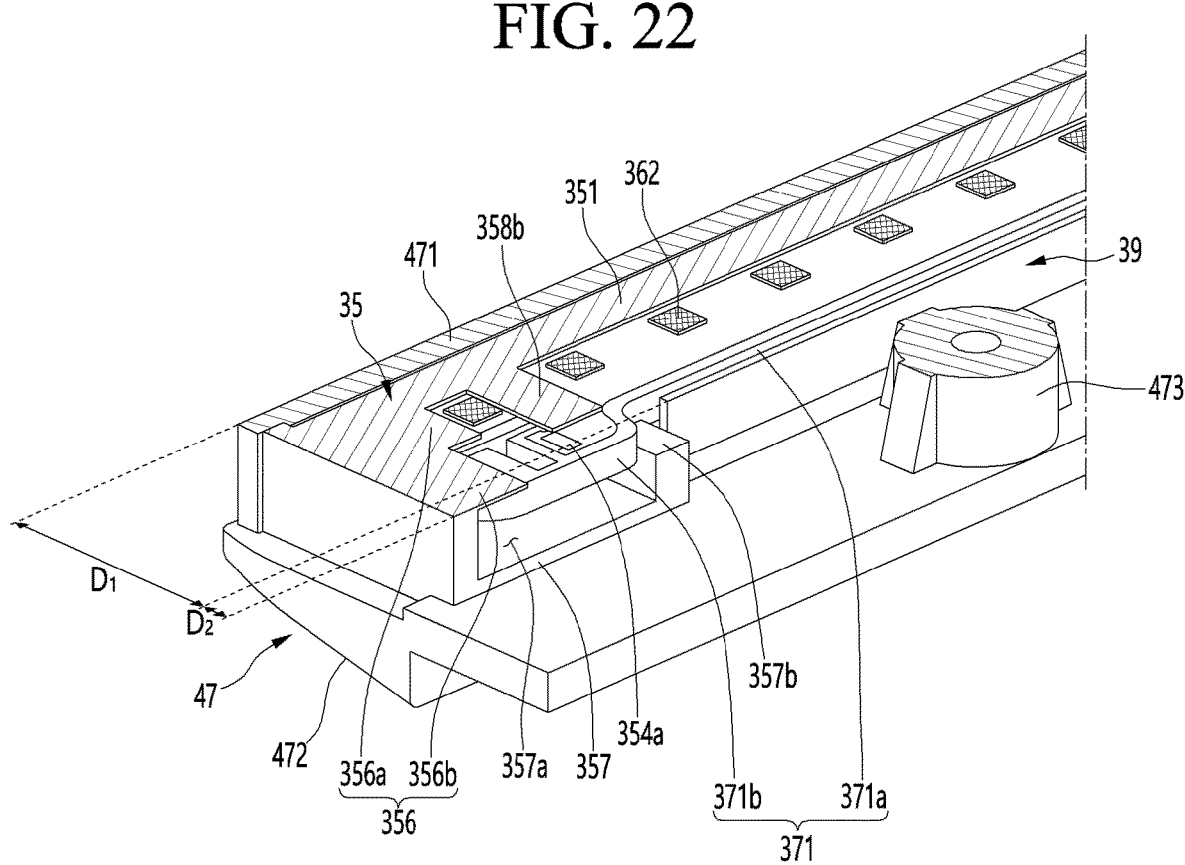
FIG. 22 is a cutaway perspective view taken along line XXII-XXII' of FIG. 5.

Hereinafter, a mounting structure of the lighting device 36 will be described in more detail with reference to the drawings. FIG. 19 is a plan view illustrating a state in which the lighting device is mounted on the door bracket. Also, FIG. 20 is a partial enlarged view illustrating a mounting state of the lighting device. Also, FIG. 21 is a cutaway perspective view taken along line XXI-XXI' of FIG. 4. Also, FIG. 22 is a cutaway perspective view taken along line XXII-XXII' of FIG. 5.

As shown in the drawings, the lighting device 36 may be mounted inside the lower bracket 35, and in this case, the substrate 361 may be disposed inside the accommodation space 350. All of the LED mounting portions 361a and the LEDs 362 of the substrate 361 may be exposed upward through the opened top surface of the accommodation space 350. In addition, among the plurality of LEDs 362, the LEDs 362 disposed at both the left and right ends may be disposed at both the left and right ends in the accommodation space 350 so as to be adjacent to both the ends of the light guide plate 33.

In addition, the LEDs 362 may be disposed at an eccentric forward position on the LED mounting portion 361a and may be in contact with the rear surface of the lower bracket front portion 351. Here, the lower bracket front surface portion 351 may extend more upward than the LED 362. In addition, the LEDs 362 may be disposed vertically below the lower end of the light guide plate 33 to effectively irradiate light.

In the state in which the substrate 361 is mounted, the bottom surface of the LED mounting portion 361a may be supported downward by the substrate support portion protrusion 354a, and the top surface of the LED mounting portion 361a may be supported upward by the light guide plate supporting part 355. Thus, the LED mounting portion 361a may be firmly fixed without moving inside the lower bracket 35.

In addition, the LED mounting portion 361a may be disposed within a distance D1 between the panel 31 and the back cover 39. That is, it is seen that the LED mounting portion 361a is disposed inside the panel assembly 30.

The substrate protrusion 361b may protrude backward and may protrude further backward beyond the distance D1 between the panel 31 and the back cover 39. That is, the substrate protrusion 361b and the protrusion guide 357 accommodating the substrate protrusion 361b may protrude further backward than the back cover 39 and also may further protrude backward by a distance D2 set from the substrate protrusion 361b.

The protrusion guide 357 may be disposed on one end of both the left and right ends of the lower bracket 35. In addition, the protrusion guide 357 may protrude backward from the lower bracket rear surface portion 352. Here, the protrusion guide 357 may protrude backward through the cover opening 398 of the back cover 39.

In addition, an opening 357a may be defined in the protruding rear surface of the protrusion guide 357, the substrate protrusion 361b may be exposed backward through the opening 357a, and the wire 369 may be connected to the soldering portion 364. In addition, the substrate protrusion 361b may be more firmly fixed inside the protrusion guide 357 to prevent the mounting position of the lighting device 36 from being separated even when the panel assembly 30 is detached or prevent the wire 369 from being separated from the soldering portion 364.

The substrate 361 may be fixedly mounted inside the lower bracket 35 to be maintained at the mounting position. Particularly, the substrate protrusion 361b may be restricted by a support portion disposed on the lower bracket 35 so that the mounting position thereof is firmly maintained even when the wires 369a, 369b, and 369c are disconnected.

The support portion may include the substrate protrusion 361b or a lower support portion (or a lower support) 359 supporting the substrate 361 from the lower side. In addition, the support portion may include the substrate protrusion 361b or an upper support portion (or upper support) 358 supporting the substrate 361 from the upper side. In addition, the support portion may include the substrate protrusion 361b or a side support portion (or side support) 356 supporting one end of the substrate 361. Of course, the support portion may include at least one of the lower support portion 359, the upper support portion 358, and the side support portion 356.

When looking at this in more detail, the lower support portion 359 protruding upward may protrude from the bottom surface of the protrusion guide 357. In addition, the lower support portion 359 may support a connection point of the LED mounting portion 361a and the substrate protrusion 361b from the lower side.

The lower support portion 359 may define one end (right end in FIG. 20) among the left and right both ends of the protrusion guide 357. In addition, the lower support portion 359 may protrude upward from the lower side to support the bottom surface of the substrate 361. In addition, the lower support portion 359 may extend to cross the substrate 361 in the front and rear direction to simultaneously support and restrict the LED mounting portion 361a and the substrate protrusion 361b.

For example, the lower support portion 359 may include a support portion groove 359a that supports the LED mounting portion 361a and a support portion protrusion 359b which is in contact with a side end of the substrate protrusion 361b to restrict the substrate protrusion 361b. The support portion groove 359a may be recessed from an upper end of the lower support portion 359 and may be recessed to a size corresponding to a width of the LED mounting portion 361a in the front and rear direction. Thus, the LED mounting portion 361a may be inserted into the support portion groove 359a and may support the bottom surface of the substrate 361 as well as restrict movement in the front and rear direction.

The support portion protrusion 359b may protrude upward from a rear end of the support portion groove 359a. Thus, the support portion protrusion 359b and the support portion groove 359a may be provided to be stepped with respect to each other, and the substrate 361 may be restricted by the stepped portion between the support portion protrusion 359b and the support portion groove 359a. Thus, the support portion groove 359a may be referred to as a first stepped portion, and the support portion protrusion 359b may be referred to as a second stepped portion.

In addition, the support portion protrusion 359b may support one end (right end in FIG. 20) of the substrate protrusion 361b. Thus, the movement of the substrate protrusion 361b in the left and right direction and the movement of the substrate 361 in the left and right direction may be restricted. In addition, the LED mounting portion 361a of the substrate 361 and an edge of the substrate protrusion 361b may be restricted by the support portion groove 359a and the support portion protrusion 359b to prevent the substrate 361 from moving.

In addition, the substrate protrusion 361b may be spaced apart from a bottom surface of an inner space of the protrusion guide 357 by the lower support portion 359. That is, the inner space of the protrusion guide 357 with respect to the substrate 361 may be spaced apart in the vertical direction, and thus, the wires 369a, 369b, and 369c may be easily connected to top and bottom surfaces of the substrate protrusion 361b, respectively.

In addition, the upper support portion 358 that supports a connection point between the LED mounting portion 361a and the substrate protrusion 361b from the upper side may be disposed above the substrate protrusion 361b. The upper support portion 358 may be disposed above the lower support portion 359 and may be disposed at a position facing the lower support portion 359. Thus, the substrate 361 may be restricted to be sandwiched between the upper support portion 358 and the lower support portion 359. Thus, the upper support portion 358 may restrict the top surface of the substrate 361 from the upper side, and the lower support portion 359 may restrict the bottom surface of the substrate 361 from the lower side.

The upper support portion 358 may include a vertical extension portion 358a extending downward from an upper end of the bracket opening 352a and a horizontal extension portion 358b extending forward from a lower end of the vertical extension portion 358a so as to be in contact with the top surface of the substrate 361.

The vertical extension portion 358a may be disposed on an area corresponding to the substrate protrusion 361b. More specifically, the vertical extension portion 358a may be disposed above a point at which the side end of the substrate protrusion portion 361b and the LED mounting portion 361a are connected to each other.

In addition, the horizontal extension portion 358b may extend backward in a state of being in contact with the top surface of the substrate 361. The horizontal extension portion 358b may extend to pass between the LEDs 362 and may extend up to an end of the LED mounting portion 361a. That is, a specific position of the substrate 361 from which the substrate protrusion 361b starts to protrude by the upper support portion 358 and the lower support portion 359 may be respectively pressed from the upper and lower sides and thus may be fixed.

A side support portion 356 extending inward may be further disposed on one side of the protrusion guide 357. The side support portion 356 may protrude laterally from the inner side of the lower bracket side portion 353 and may be in contact with the top surface of the substrate 361. Thus, the top surfaces of the LED mounting portion 361*a* and the substrate protrusion 361*b* may be restricted by being pressed from the side ends.

In detail, the side support portion 356 may extend laterally (the right side in FIG. 20) from one side of the protrusion guide 357. For example, the side support portion 356 may be disposed at a height corresponding to the lower end of the upper support portion 358. For example, the side support portion 356 may be disposed at a height corresponding to the lower end of the upper support portion 358.

The side support portion 356 may restrict the left end of the substrate 361 and may include a first support portion (or first support surface) 356*a* restricting the side end of the LED mounting portion 361*a* and a second support portion (or second support surface) 356*b* restricting the side end of the substrate protrusion 361*b*.

The first support portion 356*a* may be in contact with the top surface of the LED mounting portion 361*a* and may extend from the left end to the right side of the LED mounting portion 361*a*. Here, the first support portion 356*a* may protrude to a position that does interfere with the first LED 362.

In addition, the second support portion 356*b* may be in contact with the top surface of the substrate protrusion and may extend from the left end to the right side of the substrate protrusion 361*b*. Here, the second support portion 356*b* may protrude to a position that does not interfere with the soldering portion 364 and may protrude less than the first support portion 356*a*.

Thus, the second support portion 356*b* may have a structure, in which the side ends of the substrate 361 and the substrate protrusion 361*b* are restricted by the side support portion 356, but does not interfere with the light irradiation of the LED 362 and the connection of the wires 369*a*, 369*b*, and 369*c* of the substrate protrusion 361*b*. As described above, the substrate protrusion 361*b* may be maintained in the firmly mounted state by the lower support portion 359, the upper support portion 358, and the side support portion 356, and the movement of the substrate 361 may be prevented to prevent the wire 369 from being disconnected from the substrate 361.

Figure 23:
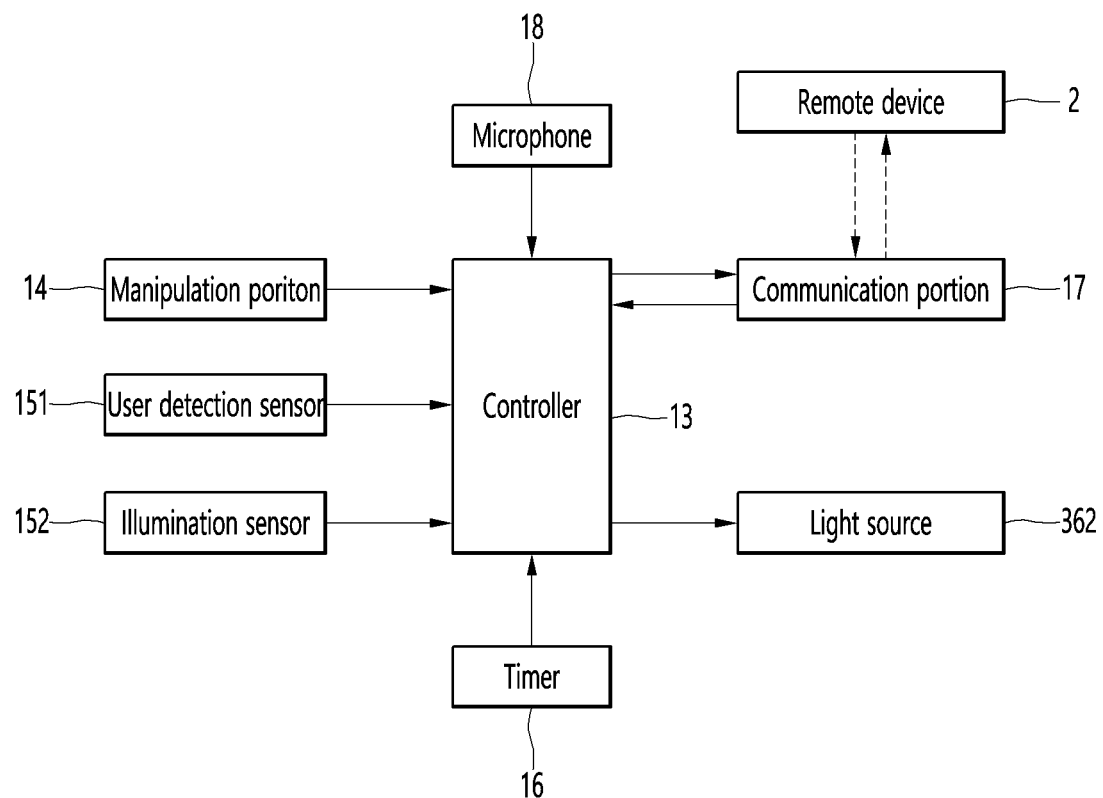
FIG. 23 is a block diagram illustrating a flow of a control signal of the refrigerator.
Figure 24:
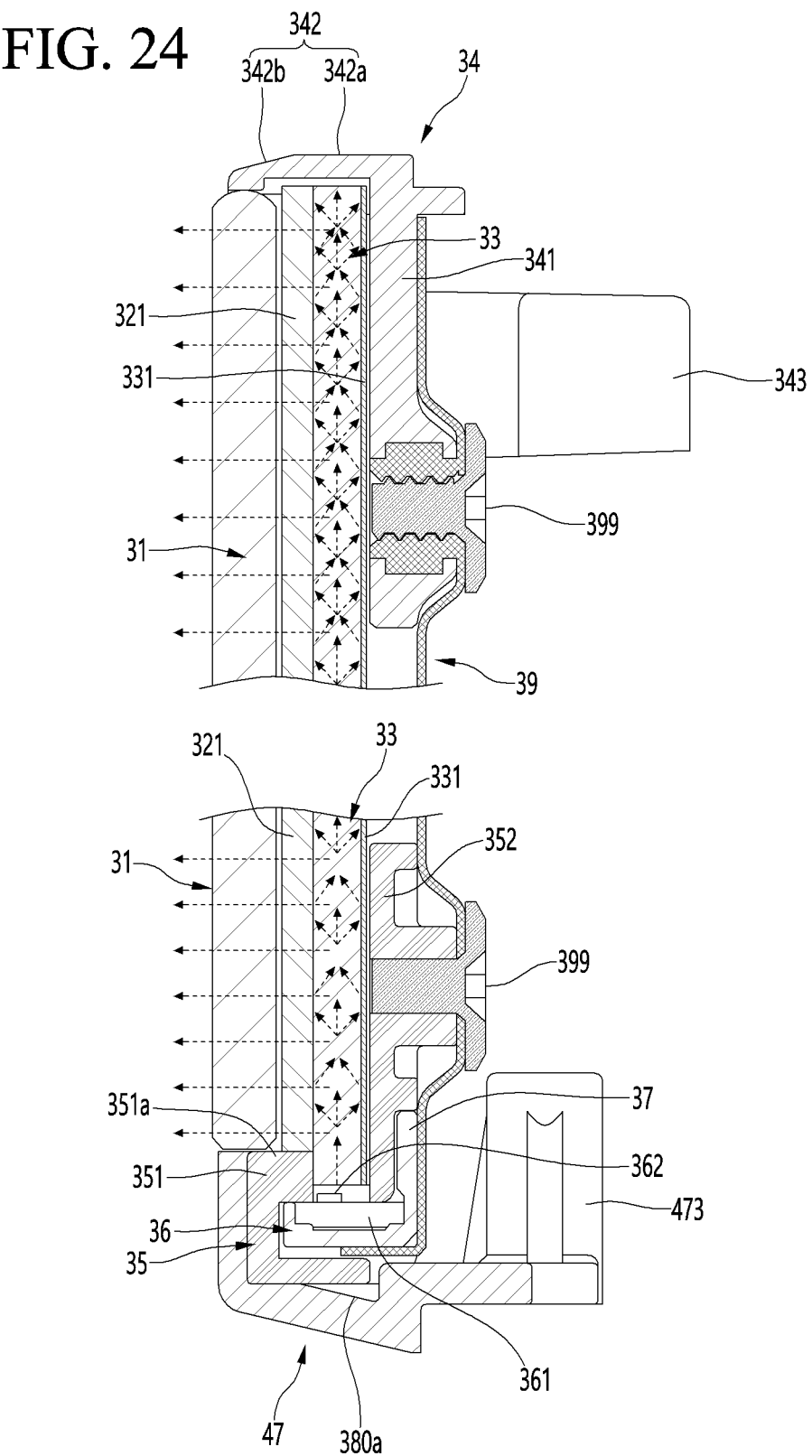
FIG. 24 is a cross-sectional view illustrating an emission state of the panel assembly.
Figure 25:
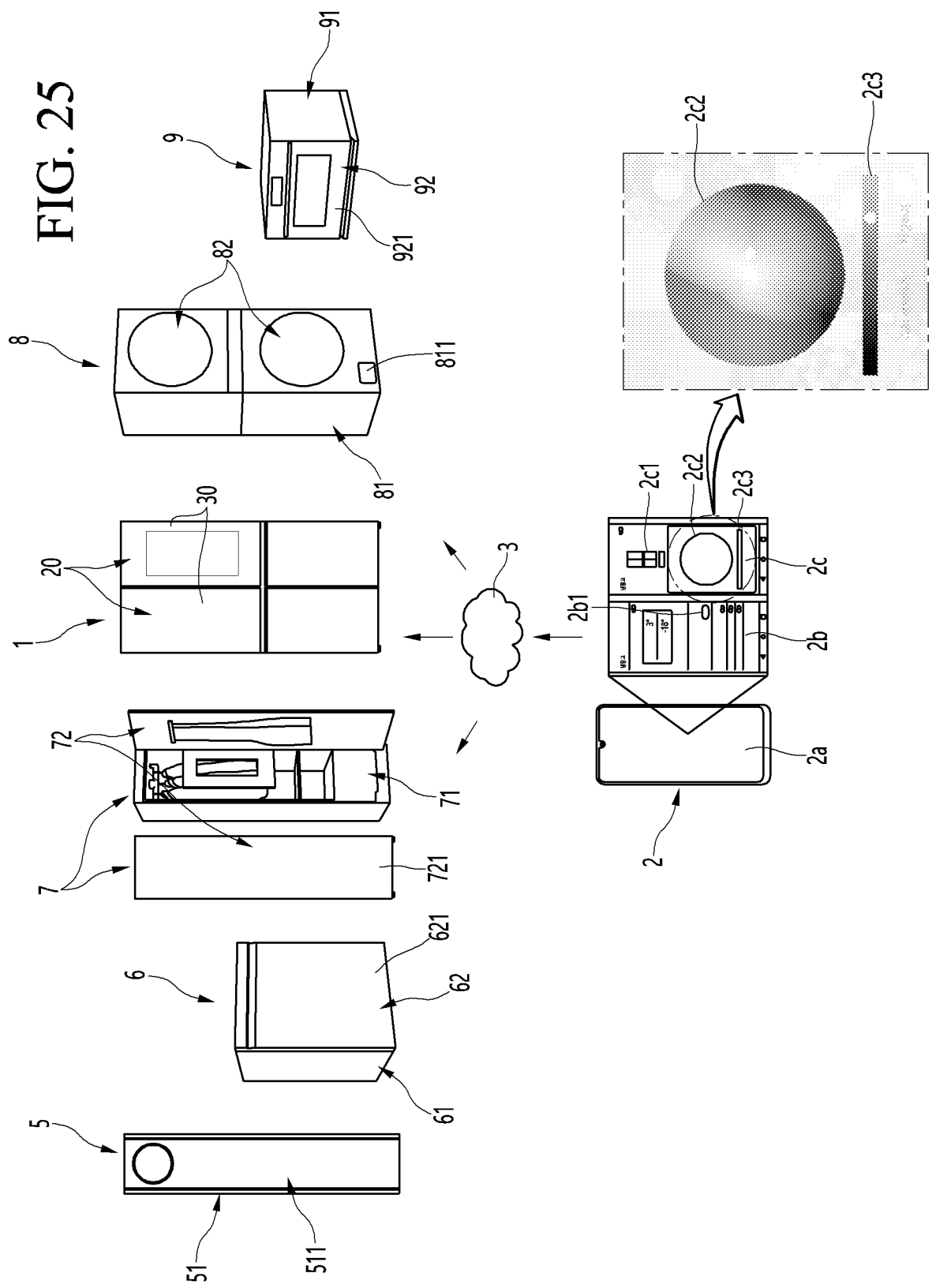
FIG. 25 is a view illustrating an example of adjusting colors of home appliances to which the panel assembly using a remote device is applied.

Hereinafter, the operations of the refrigerator 1 and the panel assembly 30 having the above structures will be described in more detail with reference to the drawings. FIG. 23 is a block diagram illustrating a flow of a control signal of the refrigerator. Also, FIG. 24 is a cross-sectional view illustrating an emission state of the panel assembly. Also, FIG. 25 is a view illustrating an example of adjusting colors of home appliances to which the panel assembly using a remote device is applied.

As illustrated in the drawing, an outer appearance of the home appliance according to an embodiment may be defined by the panel assembly 30, and also, a color of the outer appearance of the home appliance may be changed to a color that is set by the user according to the operation of the lighting device 36. The panel assembly may be expressed in various colors by light irradiated from the rear side, and thus the panel assembly 30 or the panel 31 may be referred to as a screen.

The home appliance may be any one of a refrigerator 1, an air conditioner 5, a dishwasher 6, a clothes manager 7, a washing machine 8, or a cooking appliance 9, each of which has a front surface of which a color of an outer appearance is freely changed by applying the same structure as the panel assembly 30 according to an embodiment.

For example, in the above-described embodiment and in the refrigerator 1, the panel assembly 30 may be provided on a front side of the door 20 that opens and closes the cabinet 10. In addition, the panel assembly 30 may shine in a set color by user setting, and the outer appearance of the front surface of the refrigerator 1 may be changed in color.

As another example, an indoor unit of the air conditioner 5 may have a space in which a heat exchange device and a fan are provided inside a case 51 (or cabinet) that defines an outer appearance of the indoor unit. In addition, a front surface of the case 51 may be defined by a panel assembly 511. The panel assembly 511 may have the same structure as the panel assembly 30 of the refrigerator 1 to emit light. Thus, the panel assembly 511 may shine in a set color by the user setting, and a color of the outer appearance of the front surface of the indoor unit of the air conditioner 5 may be changed into the set color.

As another example, in the dishwasher 6, a space for washing dishes may be defined inside a case 61 or a cabinet that defines an outer appearance of the dishwasher 6. In addition, the front surface of the case 61 may be opened and closed by the door 62, and the front surface of the door 62 may be defined by the panel assembly 621. The panel assembly 621 may have the same structure as the panel assembly 30 of the refrigerator 1 to emit light. Thus, the panel assembly 621 may shine in a set color by the user setting, and a color of the outer appearance of the front surface of the dishwasher 6 may be changed into the set color.

As another example, in the clothes manager 7, a space for storing clothes may be defined inside a case 71 or a cabinet that defines an outer appearance of the clothes manager 7. In addition, the front surface of the case 71 may be opened and closed by the door 72, and the front surface of the door 72 may be defined by the panel assembly 721. The panel assembly 721 may have the same structure as the panel assembly 30 of the refrigerator 1 to emit light. Thus, the panel assembly 721 may shine in a set color by the user setting, and a color of the outer appearance of the front surface of the clothes manager 7 may be changed into the set color.

As another example, in the washing machine 8 or a dryer, a space for washing or drying may be defined inside a case 81 (or cabinet) that defines an outer appearance of the washing machine 8. In addition, a front of the case 81 may be opened and closed by the door 82. The front surface of the case 81 may be defined by a panel assembly 811. The panel assembly 811 may have the same structure as the panel assembly 30 of the refrigerator 1 to emit light. Thus, the panel assembly 30 may shine in a set color by the user setting, and a color of the outer appearance of the front surface of the washing machine 8 or the dryer of the air conditioner 8 may be changed into the set color.

As another example, in the cooking appliance 9, a space for cooking food may be defined inside a case 91 or a cabinet that defines an outer appearance of the cooking appliance. In addition, the front surface of the case 91 may be opened and closed by the door 92, and the front surface of the door 92 may be defined by the panel assembly 921. The panel assembly 921 may have the same structure as the panel assembly 30 of the refrigerator 1 to emit light. Thus, the panel assembly 921 may shine in a set color by the user setting, and a color of the outer appearance of the front surface of the cooking appliance 9 may be changed into the set color.

A process of changing the color of the panel assembly 30 will be described below. In a state in which the lighting device 36 is turned off, a color of the outer appearance of the front surface may be expressed by the color of the panel 31. A color displayed on the panel 31 in the state in which the lighting device 36 is turned off may be referred to as a first color.

When the lighting device 36 operates, the color of the panel 31 may be changed according to a color of light irradiated from the lighting device 36, and a color of the outer appearance of the front surface of the door 20 may be expressed in the selected color. In this case, the color of the light irradiated from the lighting device 36 may be referred to as a second color, and the color of the panel that is changed when the lighting device 36 is turned on may be referred to as a third color.

The second color may be different from the third color, and the third color of the panel 31 selected by the user may be implemented by the second color corrected in consideration of the first color of the panel 31 itself. That is, the light having the second color irradiated from the lighting device 36 may be determined by the controller 13 in consideration of the first color of the panel 31 itself, and the light having the second color may pass through the panel having the first color, and thus, the panel 31 may be finally expressed in the third color that is selected by the user.

In detail, the color of the panel 31 may be determined by a selective operation of the lighting device 36. For example, the lighting device 36 may also be manipulated and set through a remote device 2 spaced apart from the refrigerator 1. The refrigerator 1 may communicate with the remote device 2 through a communicator 17 connected to a controller 13, and the user may manipulate an operation of the lighting device 36 through the remote device 2.

The communicator 17 may communicate with the remote device 2 using various methods. For example, the communication unit 17 may have a structure capable of communicating in at least one of wired, wireless and short-range communication (Bluetooth, Wi-Fi, Zigbee, NFC, etc.). The remote device 2 may be various devices that are capable of communicating, such as a dedicated terminal, a mobile phone, a tablet, a portable PC, a desktop PC, a remote control, or a Bluetooth speaker.

The user may manipulate and set the overall operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The selection of the color change of the panel 31 through the remote device 2 will be described with reference to FIG. 25. The user may select a desired color of the panel 31 through a screen 2a of the remote device 2 such as a mobile phone or a terminal.

When the user manipulates the remote device 2, the remote device first outputs a menu screen 2b and manipulates a panel color change menu 2b1 through the menu screen 2b. When the user selects the panel color change menu 2b1, the remote device 2 may output a color selection screen 2c from the menu screen 2b, and the user may select a position of the panel 31 to be changed and the color of the panel 31 to be changed on the color selection screen.

In detail, a panel position selection menu 2c1 may be displayed on the color selection screen 2c to select the panel 31 mounted on the door 20 at a desired position among the plurality of doors 20. In addition, the panel 31 of the door 20 selected by the user may be displayed on the panel position selection menu 2c1.

After selecting the desired position of the panel 31, the user may select and input color selection menus 2c2 and 2c3 displayed on the color selection screen 2c. For example, in the color selection menus 2c2 and 2c3, all of the colors to be displayed by the panel 31 may be displayed in the form of a color picker capable of confirming and extracting a color code. The color selection menus 2c2 and 2c3 may be referred to as a palette because combinations and selection of various colors are possible.

The color selection menus 2c2 and 2c3 may include a circular first selection portion 2c2 and a bar-shaped second selection portion 2c3. The first selection portion 2c2 may select a color, and the second selection portion 2c3 may select an intensity of the selected color. The color selection menus 2c2 and 2c3 may include either one of the first selection portion 2c2 or the second selection portion 2c3.

As described above, the user may select the color of the panel 31, i.e., the third color, from among various colors through the color selection menus 2c2 and 2c3. Of course, the color selection menus 2c2 and 2c3 may be configured to be capable of being input in the form of letters, codes, and numbers. In addition, according to the user's selection of the third color, the controller 13 may control the lighting device 36 to be turned on in the second color so that the panel 31 is displayed in the third color.

In addition, the user may input a color through a manipulation portion 14 provided in the refrigerator 1 without using the remote device 2. In addition, each of the refrigerator 1 and the remote device 2 may be connected to a server in a network state, and thus, the color of the panel 31 of the refrigerator 1 may be input through the server 3.

The operation of the lighting device 36 may be performed by the manipulation of the manipulation portion 14 by the user. The manipulation portion 14 may be disposed at one side of the refrigerator 1, and for example, may be disposed at one side of the cabinet 10. As necessary, the manipulation portion 14 may be provided in the door 20, or the manipulation may be input by touching and manipulating the panel 31 such as knock. That is, the user may directly manipulate the manipulation portion 14 to set an operation of the lighting device 36 and may turn on or off the lighting device 36.

In addition, the lighting device 36 may also operate by a sensor. The sensor may be, for example, a user detection sensor 151 for detecting proximity of the user. For example, the user detection sensor 151 may use various devices for detecting user approaching near the refrigerator, such as an infrared sensor, an ultrasonic sensor, or a laser sensor.

The sensors 15 may be disposed at various positions for detecting proximity of the user, such as one side of the cabinet or one side of the door 20, and may be disposed at various positions for detecting proximity of the user. A plurality of sensors may be disposed at different positions.

Thus, when the user approaches the refrigerator 1 by a set distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 35.

In detail, when the user detection sensor 151 detects that the user is very close to the refrigerator 1, the lighting device 36 may be turned off or the brightness may be gradually dimmed to prevent glare of the user. When the user moves away from the refrigerator 1 again, the lighting device 35 may be turned on again or may return to an original brightness.

The sensor may be an illumination sensor 152. The illumination sensor 152 may detect illumination of an indoor space and may be disposed at the same position as a position at which the user detection sensor 151 is disposed.

The lighting device 36 may be operated according to a detected illumination of the illumination sensor 152. For example, when the detected illumination of the illumination sensor 152 is equal to or less than a set illumination and the lighting device 36 is dimmed, the controller 13 may turn on the lighting device 36, and when the detected illumination of the illumination sensor 152 is equal to or greater than the set illumination and the lighting device 36 becomes brighter, the controller 13 may turn off the lighting device 36.

The sensor may include both the illumination sensor 152 and the user detection sensor 151, and the illumination sensor 152 and the user detection sensor 151 may be operated in a complex way to cause the controller 13 to turn off the lighting device 36.

The controller 13 may be connected to a microphone 18. Thus, the LED 362 may shine with set color according to a voice signal received from the microphone 18, and an input state of the voice signal or a setting state of a function may also be displayed through the front color of the door 20. For example, when receiving a temperature control signal of the user through the microphone 18, the controller 13 may adjust a set temperature inside the refrigerator, and may operate the lighting device 36 to change color of the front surface of the door 20 to color corresponding to the corresponding temperature.

The lighting device 36 may be turned off at a time set by a timer 16. That is, the lighting device 36 may be turned on according to a time when the user is mainly active and may be maintained off outside the set time range. The lighting device 36 may be turned off during the day and on during night irrespective of actual illumination. Irrespective of an operation state of the refrigerator 1, the brightness and color of the front surface of the door 20 may be adjusted only according to user settings.

The lighting device 36 may include the state in which brightness is adjusted in addition to an on state and an off state. That is, the controller 13 may control the output of the light irradiated through the lighting device 36 to change brightness of the panel 31. In addition, the operation state of the refrigerator 1 may be indicated through the brightness of the panel 31.

The operation state of the lighting device 36 operating by the controller 13 is now described. As shown in FIG. 24, when the lighting device 36 is turned on according to an instruction of the controller 13, light emitted from the LED 362 may be emitted toward the lower end of the light guide plate 33. In this case, the light emitted from the LED 362 may be irradiated with the second color selected by the controller 13. That is, the LED 362 may be an RGB LED and irradiates the light having the second color corrected by the controller 13 so that the surface of the panel 31 may shine in the third color selected by the user.

The light incident through the lower end of the light guide plate 33 may be diffused and reflected along the light guide plate 33 and then may move along the light guide plate 33. In this case, the light guided by the light guide plate 33 may be reflected forward by the reflective layer 331 to pass through the panel 31 so as to be transmitted to the outside. Light directed forward through the light guide plate 33 may pass through the transmission member 32 to illuminate the panel 31, and the front surface of the door 20 may shine with a set brightness or color. Here, the light guide plate 33 may irradiate light having sufficient brightness from the entire surface forward by the LED 362 disposed at each of both ends of an LED mounting portion 361*a*, and thus, the whole including both the ends of the panel 31 may shine with uniform brightness.

Figure 26:
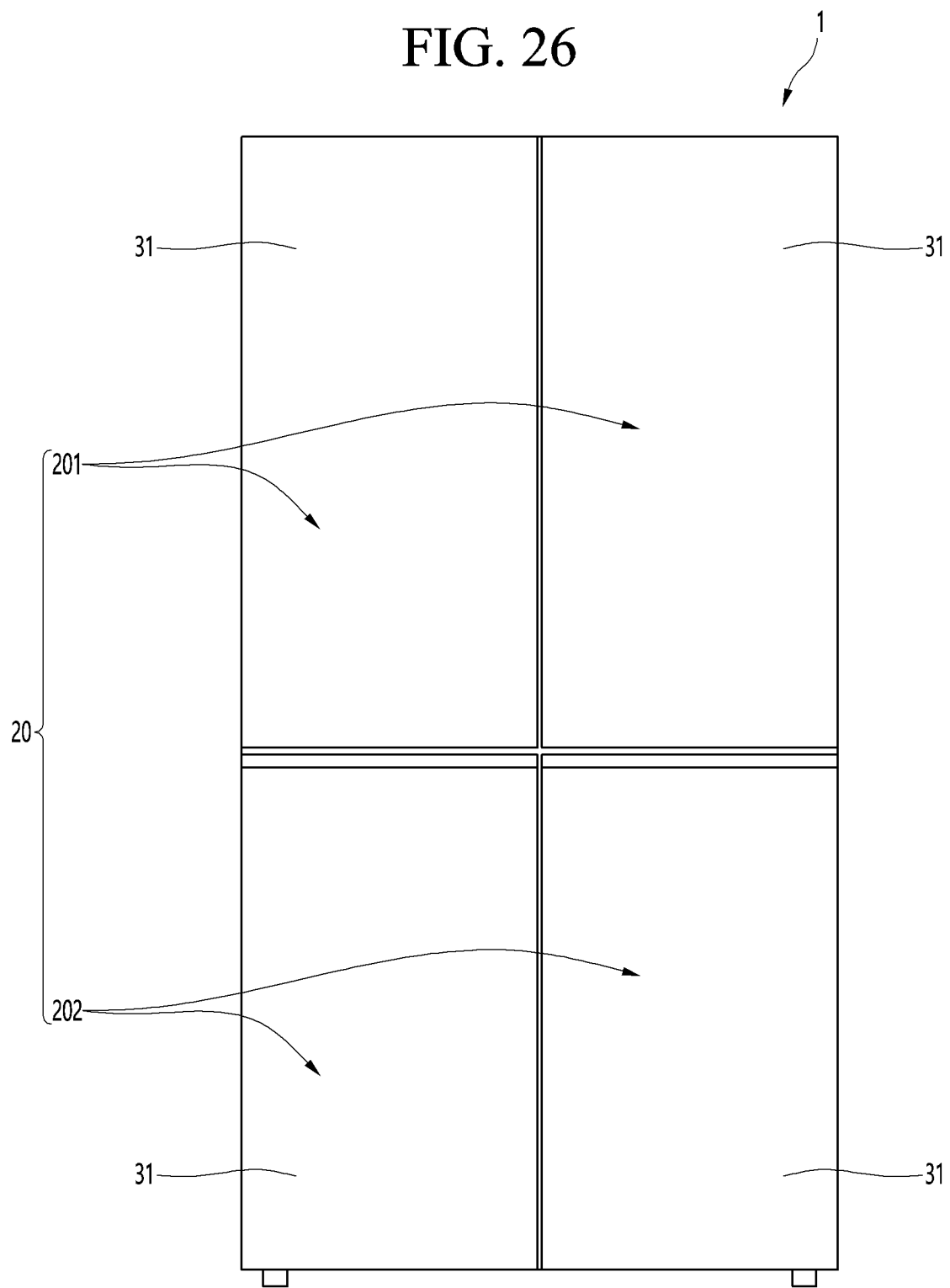
FIG. 26 is a front view illustrating an outer appearance of a front surface of the refrigerator that is in a state in which the lighting device is turned off.
Figure 27:
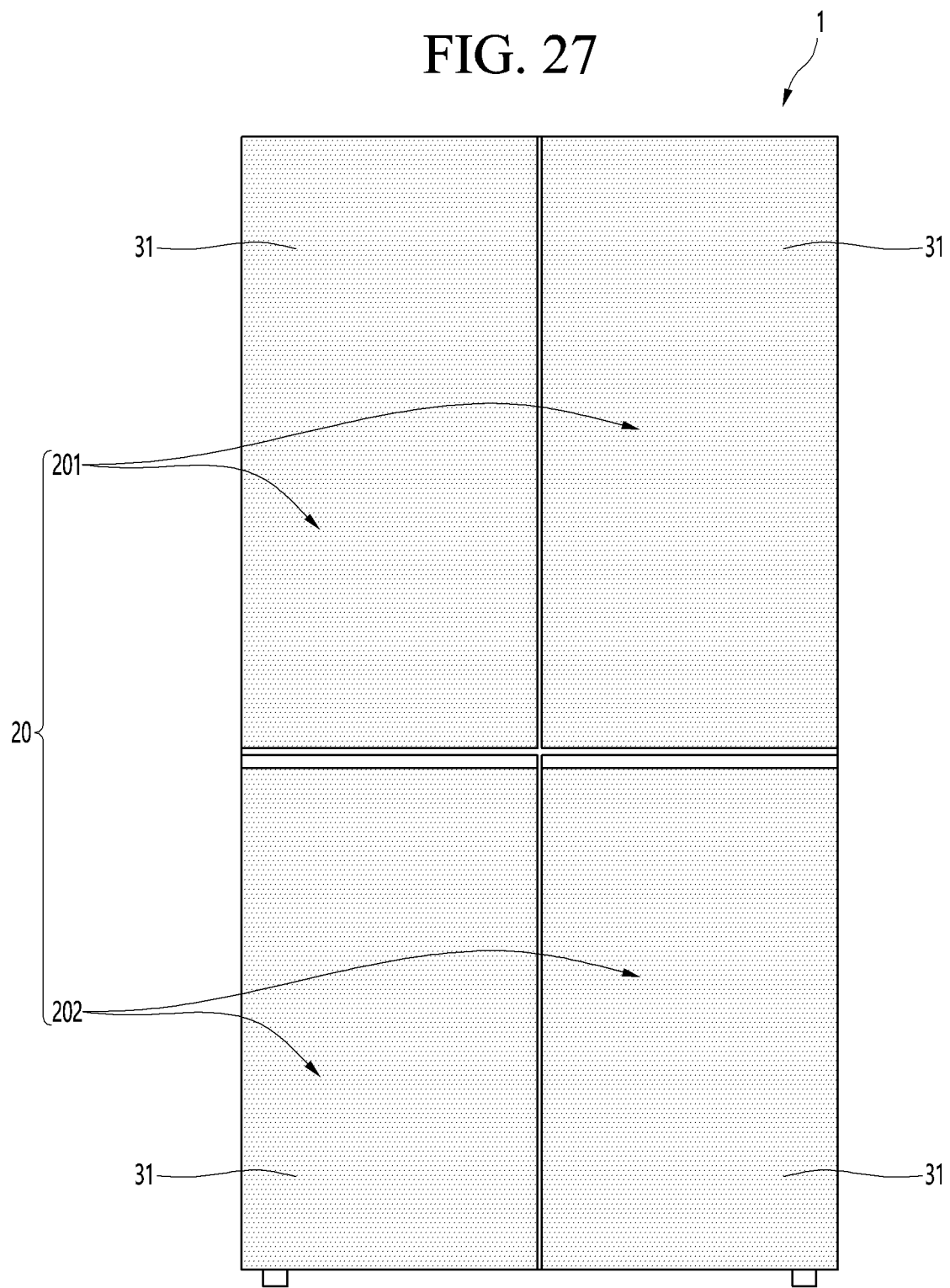
Figure 28:
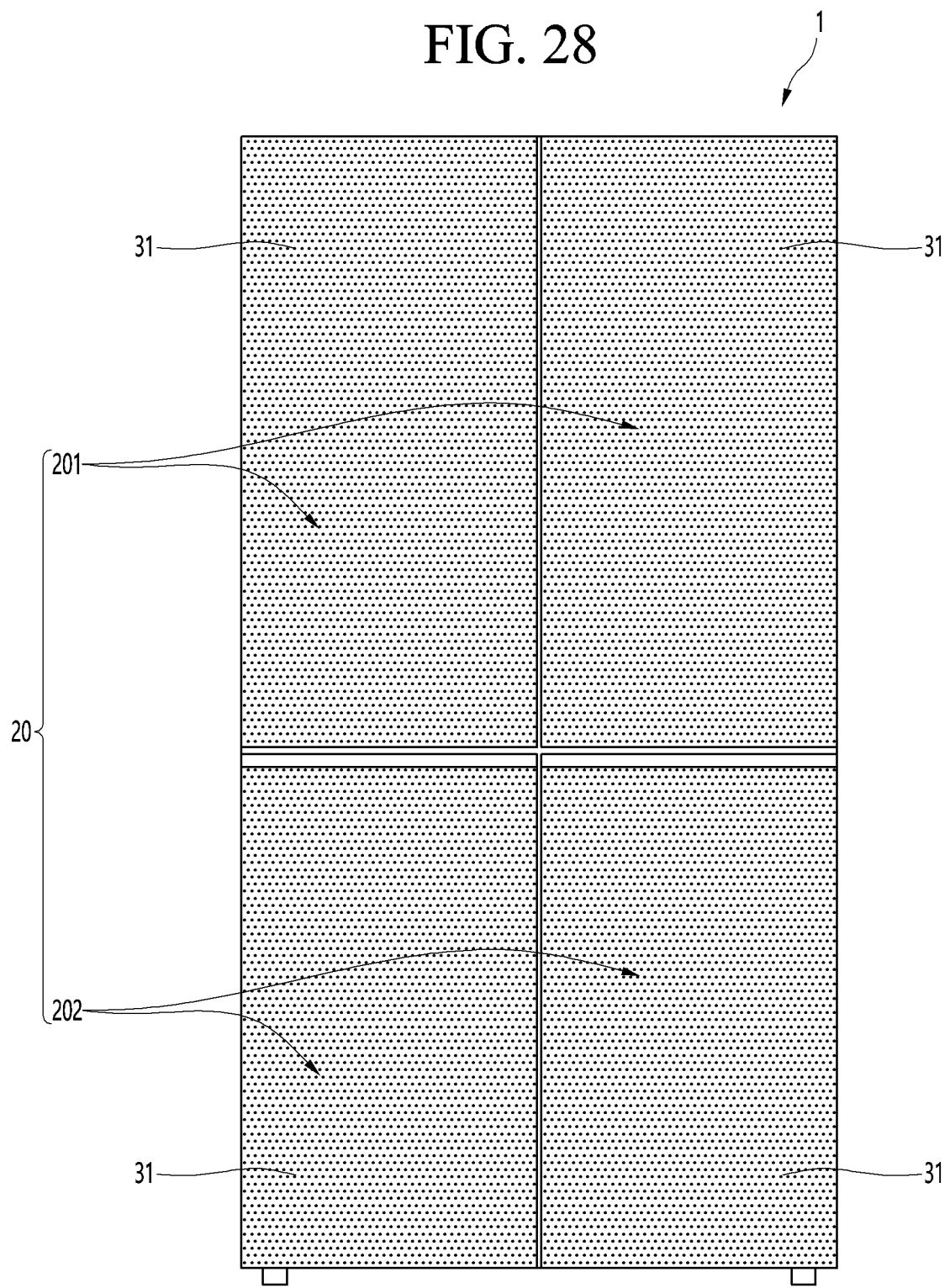
FIG. 28 is a front view illustrating an outer appearance of the front surface of the refrigerator in which the lighting device is changed in color.
Figure 29:
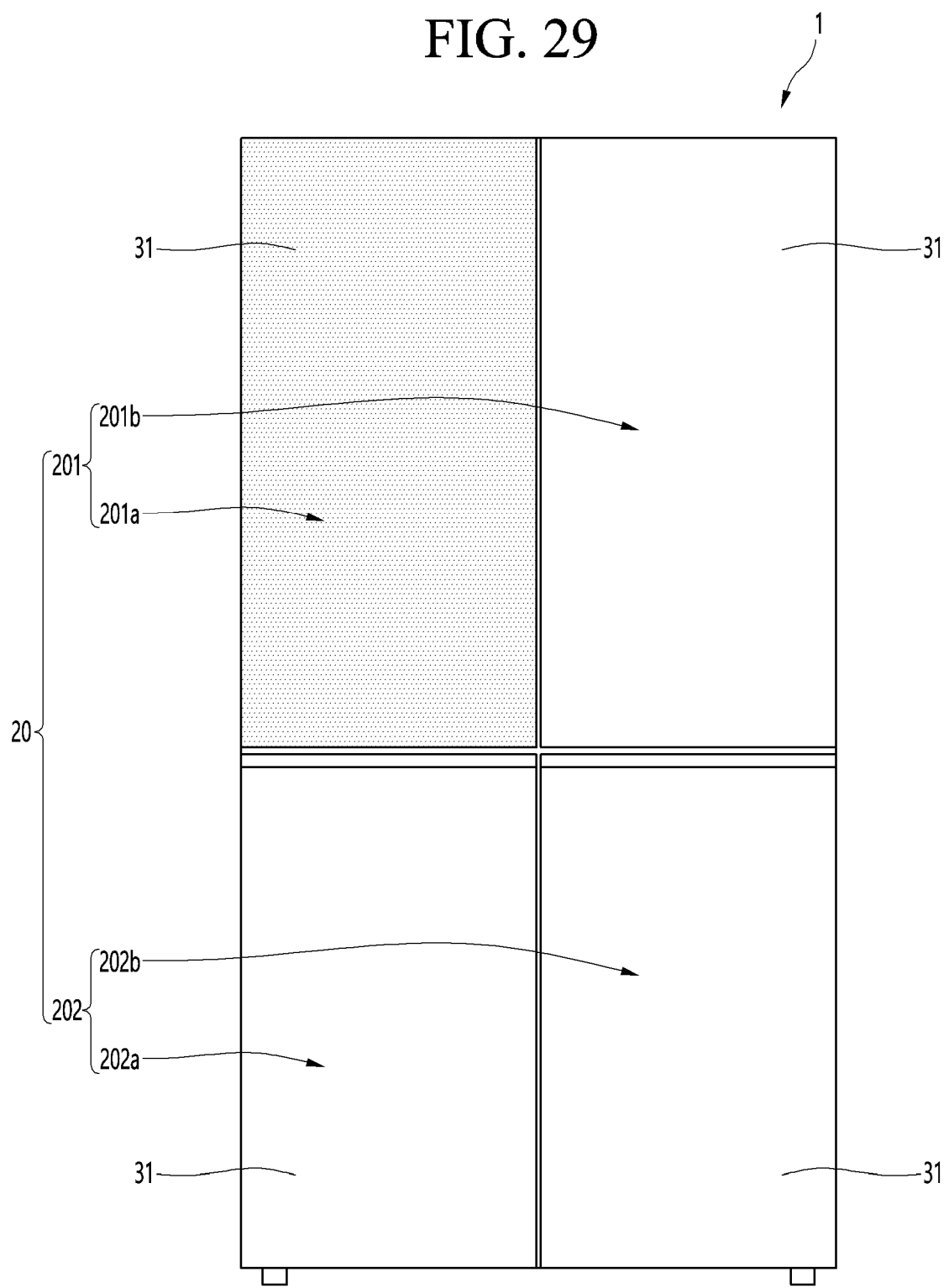
FIG. 29 is a front view illustrating an outer appearance of the front surface of the refrigerator in a state in which a portion of a plurality of doors emits light.
Figure 30:
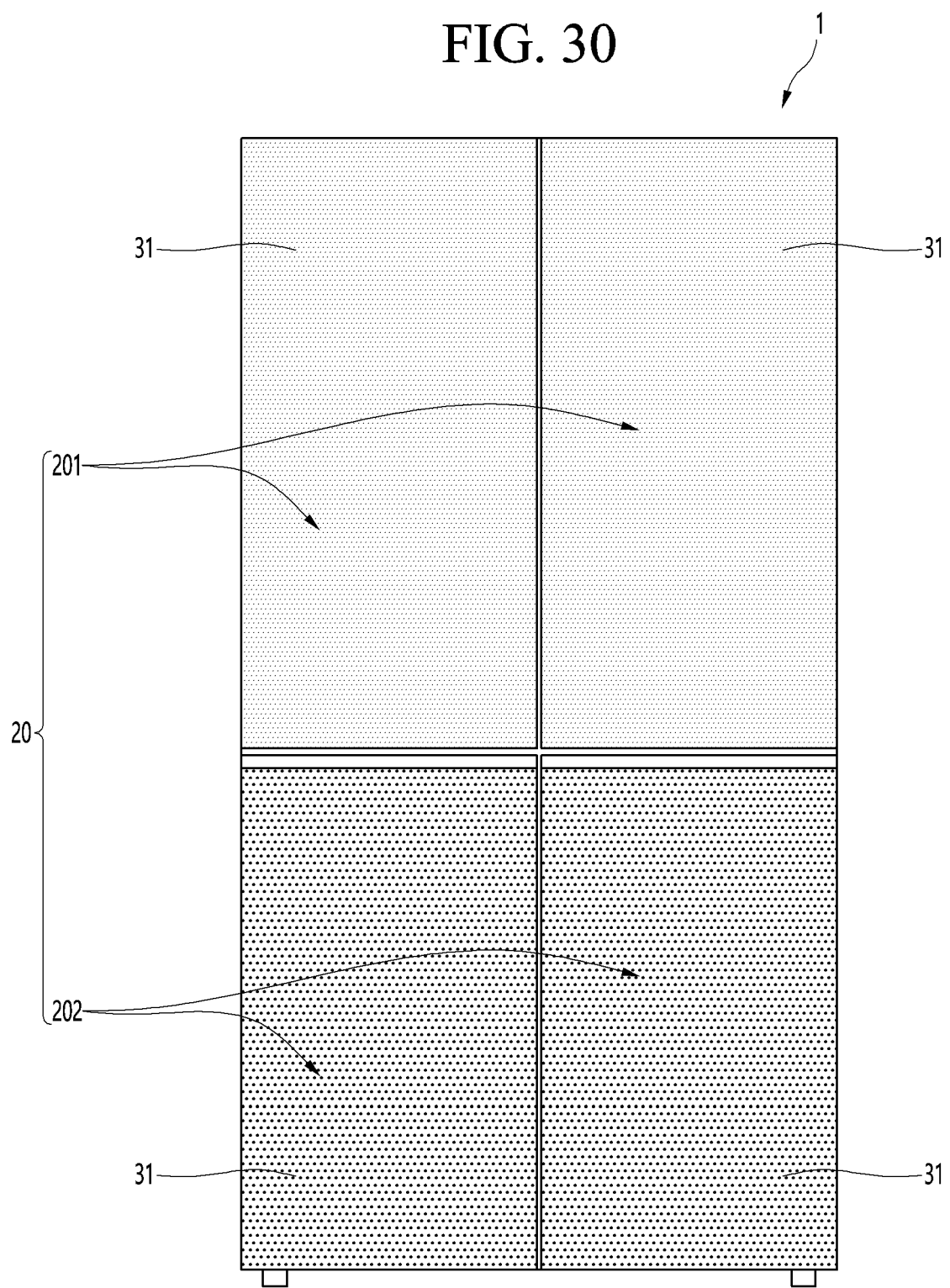
FIG. 30 is a front view illustrating the outer appearance of the front surface of the refrigerator in a state in which each of a refrigerating compartment door and a freezing compartment door of the doors emits light.

Hereinafter, a change in outer appearance of the front surface of the door 20 according to the operation of the lighting device 36 will be described with reference to the drawings. FIG. 26 is a front view illustrating an outer appearance of a front surface of the refrigerator that is in a state in which the lighting device is turned off. Also, FIG. 27 is a front view illustrating an outer appearance of a front surface of the refrigerator that is in a state in which the lighting device is turned on. Also, FIG. 28 is a front view illustrating an outer appearance of the front surface of the refrigerator in which the lighting device is changed in color. Also, FIG. 29 is a front view illustrating an outer appearance of the front surface of the refrigerator in a state in which a portion of a plurality of doors emits light. Also, FIG. 30 is a front view illustrating the outer appearance of the front surface of the refrigerator in a state in which each of a refrigerating compartment door and a freezing compartment door of the doors emits light. For example, in the state in which the lighting device 36 is turned off, as illustrated in FIG. 26, a front surface of the door 20 may not shine, and an original color of the panel assembly 30 may appear.

The panel assembly 30 may have a structure that is separable from the door body 40, and thus, the user may select a color of the first panel 31 by mounting the panel assembly 30 having a desired color. Of course, if necessary, the user may change the color of the panel 31 when the lighting device 36 is turned off by exchanging the panel assembly 30 itself. The color of the front surface of the door 20 may be seen as the color of the panel 31, and the texture and pattern provided on the panel 31 may be seen. In this case, the color of the panel 31 may be color with brightness greater than 0 and may be provided in a color other than black.

Thus, the front surface of the door 20 may be seen with the first color that is the color of the panel 31. In this case, components inside the panel assembly 30 may be seen through the panel 31 and may not be seen to the outside by the color of the panel 31. In this state, the lighting device 36 may be turned on, and when the lighting device 36 is turned on, the front surface of the door 20 may shine with a color set by the controller 13.

For example, as illustrated in FIG. 27, the controller 13 may control the front surface of the door 20 to shine with a second color different from the first color, and the lighting device 36 may cause the LED 362 to shine with the second color according to the control of the controller 13. Here, the third color may be selected by the user, and the color of the panel 31 may be selected by the manipulation of the remote device 2 or the manipulation of the manipulation portion 14.

When the LED 362 shines in the second color, the light reflected by the light guide plate 33 may pass through the front of the panel 31, and the front of the door 20, that is, the panel 31 may be expressed in the third color. In the state in which the outer appearance of the front surface of the refrigerator 1 shines with the third color, when the controller 13 instructs change in color of the front surface of the refrigerator 1, the front surface of the panel 31 may shine with a color that is reset by the controller 13.

For example, as illustrated in FIG. 28, the controller 13 may instruct change in color of the front surface of the panel 31 to shine with the second color different from the first color, and the lighting device 36 may irradiate light having a color different from that of the LED 362 according to the instruction of the controller 13.

When the LED 362 shines in the different color, the light reflected by the light guide plate 33 may pass through the light through the panel 31, and the front of the door 20, that is, the panel 31 may be expressed in the fourth color. Some of the plurality of doors 20 forming the outer appearance of the front surface of the refrigerator 1 may emit light, or the panels 31 constituting the plurality of doors 20 may independently emit light to define the outer appearance of the front surface of the refrigerator 1 with the set color.

For example, as illustrated in FIG. 29, the refrigerator 1 may operate so that some doors 20 of the plurality of doors 20 shine or shine with a specific color. That is, all the lighting devices 36 provided in the doors 20 may not operate, but instead, only some 201a of all the doors 20 may shine. For example, any one door 201a of the refrigerating compartment door 201 may shine. That is, the left refrigerating compartment door 201a among the left refrigerating compartment door 201a and the right refrigerating compartment door 201b may shine. Of course, the door 20 may be any one of the freezing compartment doors 202.

As necessary, the left refrigerating compartment door 201a and the right refrigerating compartment door 201b may shine with a different color. At least two of the doors 20 may be sequentially changed in color and at least two of the doors 20 may be sequentially turned on or off.

The refrigerating compartment door 20 or the freezing compartment door 20 among the doors may be controlled to shine with the different color. For example, as illustrated in FIG. 30, the controller 13 may control the lighting device 36 so that one pair of refrigerating compartment doors 201 are expressed in the first color. The controller 13 may control the lighting device 36 so that one pair of the refrigerating compartment doors 201 are expressed in a different color.

That is, the refrigerating compartment door 201 and the freezing compartment door 202 may be distinguished therebetween with colors, and according to a temperature change inside the refrigerator, the colors of the refrigerating compartment door 201 and the freezing compartment door 202 may also be changed. Thus, through the front color of the door 20, the user may intuitively recognize an operation state of each storage space as well as may distinguish between the refrigeration compartment and the freezing compartment.

There may be various other embodiments other than the aforementioned embodiments. According to another embodiment of the present disclosure, the storage space may be partitioned into right and left sides, and the door includes a refrigerating compartment door and a freezing compartment door at right and left sides. Another embodiment of the present disclosure may have the same structure as the aforementioned embodiment except for arrangement of a storage space and a door, and thus the same components as in the aforementioned embodiment use the same reference numeral, and a detailed description thereof may be omitted.

Figure 31:
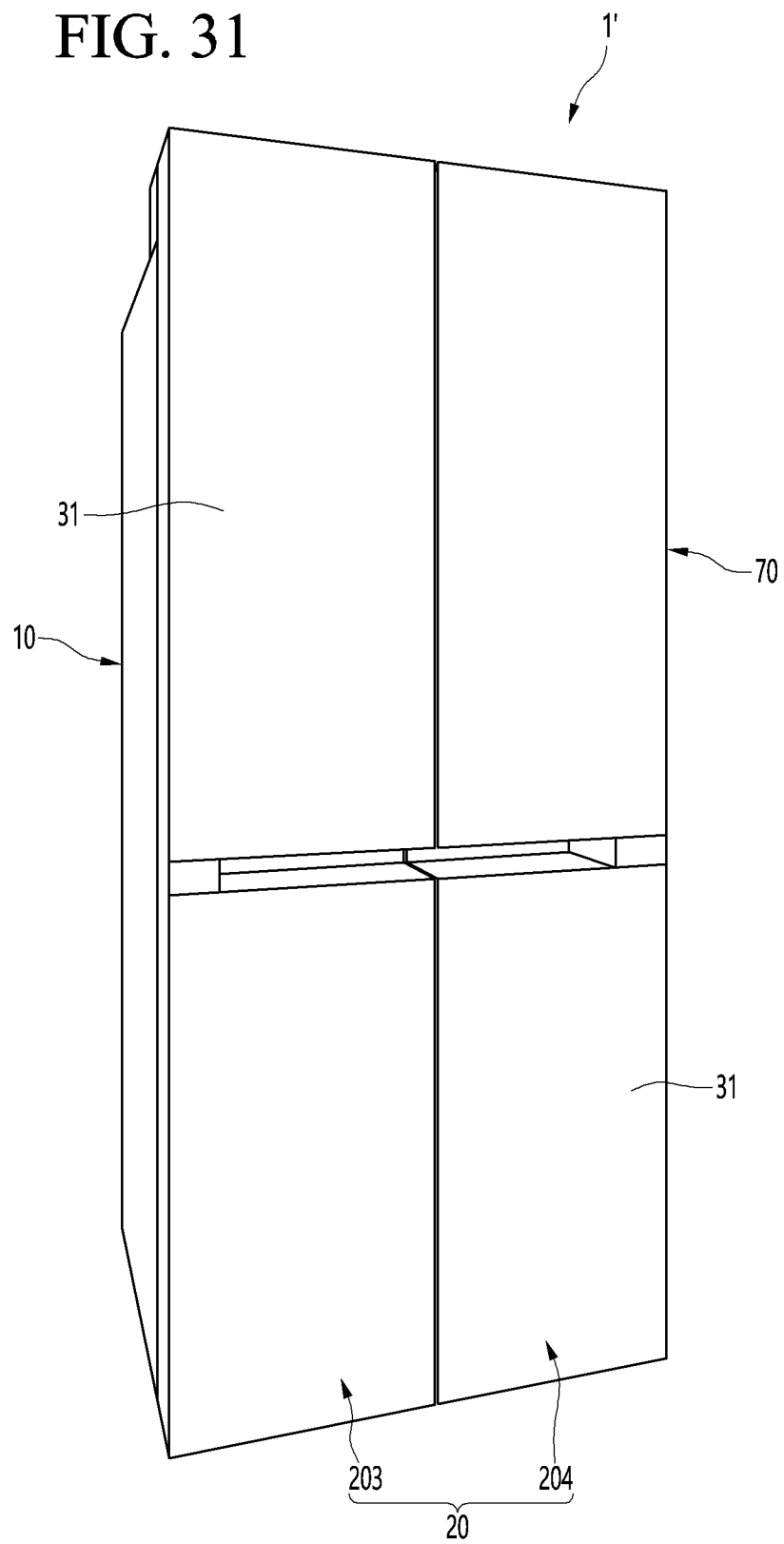
FIG. 31 is a perspective view of a refrigerator according to another embodiment.
Figure 32:
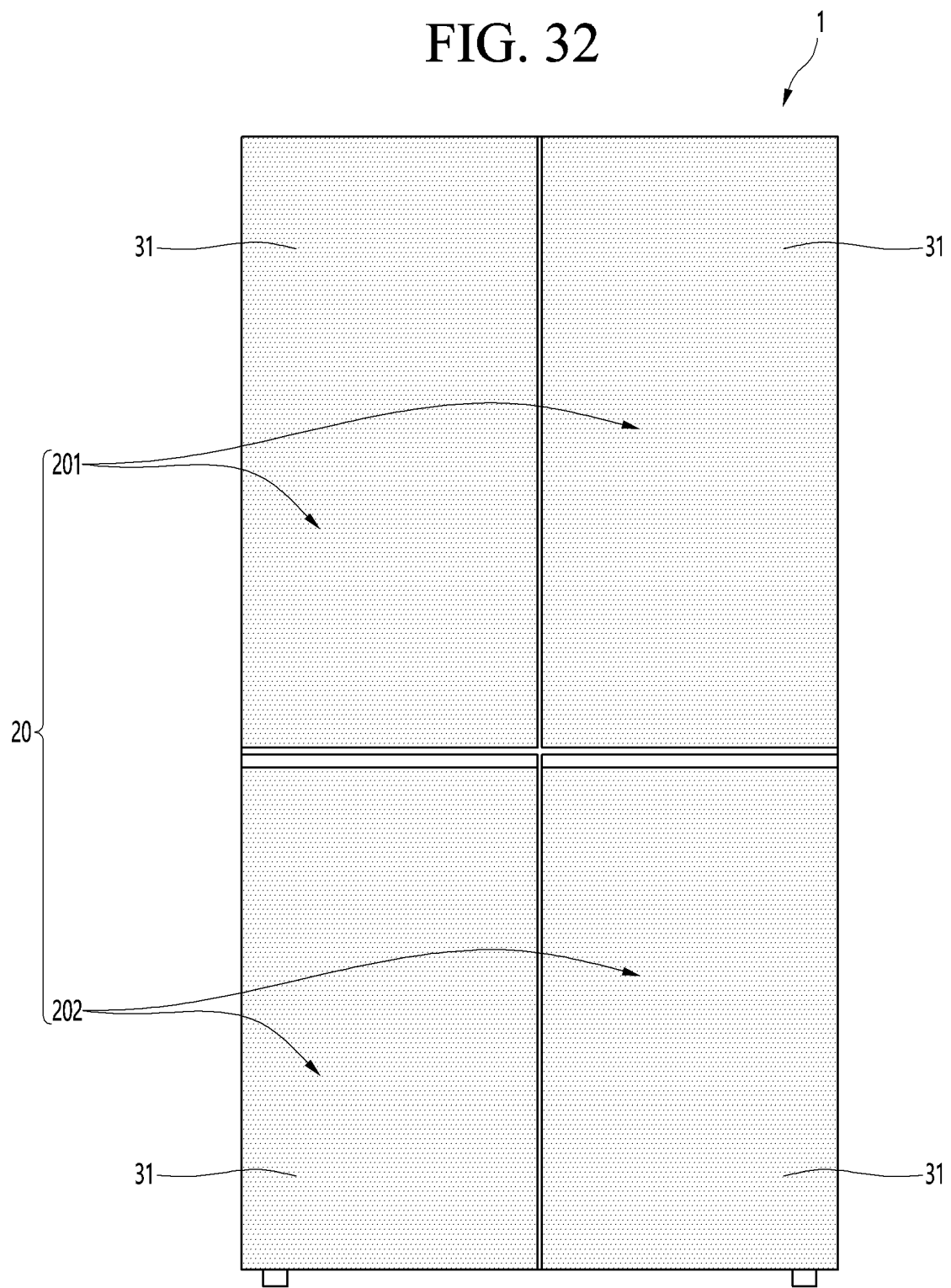

Hereinafter, another embodiment of the present disclosure will be described with reference drawings. FIG. 31 is a perspective view of a refrigerator according to another embodiment. Also, FIG. 32 is a front view of a front appearance of a refrigerator in the state in which a lighting device of the refrigerator is turned on.

As shown in the drawings, an outer appearance of a refrigerator 1' according to another embodiment of the present disclosure may be defined by the cabinet 10 in which a storage space is defined, and the door 20 for opening and closing an open front surface of the cabinet 10. The cabinet 10 may be divided into right and left sides. Although not shown, a left space of the cabinet 10 may be configured by a freezing compartment, and a right space of the cabinet 10 may be configured by a refrigerating compartment.

The door 20 may include a freezing compartment door 203 for opening and closing the freezing compartment and a refrigerating compartment door 204 for opening and closing the refrigerating compartment. The freezing compartment door 203 and the refrigerating compartment door 204 may be arranged in parallel to each other at right and left sides, and the refrigerating compartment and the freezing compartment may be configured to be opened and closed through rotation.

In the state in which the door 20 is closed, an outer appearance of the front surface of the refrigerator 1' may be defined by the door 20. The door 20 may include the door body 40 and the panel assembly 30. A detailed structure of the door 20 may be the same as the aforementioned embodiment and may be different therefrom except for the size and arrangement thereof, and thus a detailed description or illustration thereof may be omitted, and unexplained reference numerals in the drawings may refer to the aforementioned embodiment.

Color of the panel assembly 30 may be determined by the panel 31 configuring the front surface of the panel assembly 30. Thus, in the state in which the lighting device is turned off, the outer appearance of the front surface of the refrigerator 1' may be defined by color of the panel itself.

When the lighting device 36 is turned on under control of the controller 13, light emitted by the lighting device 36 may be seen through the panel 31 to change the panel 31 in color or brightness. In this case, under control of the controller 13, the lighting device 36 may emit light with various colors, and the panel 31 may be changed to various colors to shine. That is, in the state in which the door 20 is maintained to be assembled and mounted, color or brightness of the outer appearance of the front surface of the refrigerator 1' may be changed resulting in change in the outer appearance of the front surface.

As necessary, the refrigerating compartment door 204 and the freezing compartment door 203 may shine with different colors, and the refrigerating compartment door 204 and the freezing compartment door 203 may shine with color selected to harmonize with surrounding furniture or an installation environment to harmonize with a surrounding environment. When an installation or usage environment or a usage condition is change, the outer appearance of the front surface of the refrigerator 1' may be freely changed according to the change.

The home appliance according to the proposed embodiments may have the following effects. According to the embodiments, the color of the light irradiated from the lighting device may be adjusted by the user's manipulation, and thus, the color of the panel defining the front surface of the door may be changed to the selected color. Thus, there may be the advantage in that the color of the front surface of the door is changed to the desired color without replacing the panel. Particularly, there may be the advantage in that the user is capable of quickly and easily changing the color of the outer appearance to the desired color at any time desired by the user in the state in which the panel is mounted, thereby improving the use convenience.

In addition, the state, the operation information, the information of the surrounding environment, and the like of the home appliance may be displayed by changing the color of the panel, and thus, the user may intuitively recognize the information to further improve the use convenience. In addition, the lighting device that irradiates light to the light guide plate may include the substrate and the plurality of LEDs, and the substrate may extend along the lower end of the light guide plate. In addition, the substrate may include the LED mounting portion on which the LED is mounted and the substrate protrusion protruding backward from one end of the LED mounting portion so that the wire is connected.

That is, the LED mounted on the substrate may be disposed along the LED mounting portion without the interference with the connection portion of the wire and may be sufficiently densely disposed up to both the ends of the substrate. Thus, the sufficient amount of light may be irradiated to the light guide plate, and also, the light may be effectively irradiated to both the ends of the light guide plate to prevent both the ends of the panel from being darkened due to the insufficient amount of light and allow the entire panel to shine with the uniform brightness.

Particularly, only the plurality of the LEDs may be disposed on the top surface of the LED mounting portion, and the elements for the operation of the LED may be disposed on the bottom surface of the LED mounting portion, and thus, the LEDs may be densely disposed on the substrate so that the panel shines with the sufficient amount of light.

In addition, the substrate protrusion to which the wire is connected may be exposed to the rear side of the panel assembly to reduce the space in which the lighting device is mounted by the protruding distance of the substrate protrusion, thereby reducing the thickness of the panel assembly.

The panel assembly may have the slim thickness to prevent the home appliance from increasing in thickness. For example, the overall thickness of the refrigerator door may be minimized to prevent the refrigerator door from being deteriorated in insulating performance.

In addition, since the substrate protrusion has the structure exposed through the rear surface of the panel assembly, the arrangement and connection of the wire may be facilitated. Particularly, the substrate protrusion and the opening of the back cover, through which the substrate protrusion is exposed, may be disposed on the one end that is away from the rotation shaft of the door to prevent the interference with the lower hinge device for the rotation of the door so as to facilitate the connection and arrangement of the wire.

In addition, the panel assembly may be detachably provided on the front side of the door body of the door, and the wire may be connected and disposed between the rear side of the panel assembly and the front side of the door body. Thus, there may be the advantage in that the panel assembly is detachably attached to facilitate the maintenance of the panel assembly.

In addition, the mounting position of the substrate may be fixed inside the panel assembly. Particularly, although the repeated impact is applied to the structure of the door that is repeatedly opened and closed, the installation position of the substrate may be maintained due to the stable fixing structure of the substrate by the plurality of supports. In addition, there may be the advantage in that the provision of the designed amount of light to the light guide plate may be secured due to the maintenance of the installation position of the substrate.

Particularly, the support portion may support the substrate protrusion to which the wire is connected or the substrate adjacent to the substrate protrusion, and the substrate protrusion may be intensively fixed by at least one of the upper support portion, the lower support portion, and the side support portion. Therefore, even if the wire is connected to or disconnected from the substrate protrusion during the assembly or maintenance of the panel assembly, the initial mounting position of the substrate protrusion may be maintained.

In addition, the substrate may be restricted in the vertical direction, the forward and backward direction, and the left and right direction by only inserting and mounting the substrate inside the lower bracket without detaching the coupling member such as the separate screw so as to be maintained in the stable mounting state.

Embodiments provide a home appliance in which a thickness of a panel assembly capable of changing a color of a panel is minimized. Embodiments also provide a home appliance in which an entire front surface of a panel assembly shines with uniform brightness. Embodiments also provide a home appliance in which power connection of a lighting device inside a panel assembly is easy. Embodiments also provide a home appliance in which a substrate of which a portion is exposed to the outside of a panel assembly is firmly fixed. Embodiments also provide a home appliance in which a lighting device is easily maintained and repaired.

In one embodiment, a home appliance includes: a cabinet in which a storage space is defined; and a door including a door body configured to open and close the storage space and a panel assembly mounted on a front surface of the door body, wherein the panel assembly includes: a panel which is configured to define an outer appearance of a front surface of the door and through which light is transmitted; a light guide plate provided behind the panel to guide the light toward the panel; a lighting device including a plurality of LEDs configured to irradiate light having a set color toward the light guide plate and a substrate on which the LEDs are mounted; and a bracket on which the lighting device is mounted, wherein a substrate protrusion which protrudes toward a front surface of the door body and to which a wire is connected is disposed on the substrate, and the bracket includes at least one or more support portions configured to support the substrate protrusion.

The substrate may include an LED mounting portion which is provided at a position facing an end of the light guide plate and on which the plurality of LEDs are continuously disposed, and the substrate protrusion may protrude from the LED mounting portion to pass through a rear surface of the panel assembly. The support portion may be configured to support the LED mounting portion and the substrate protrusion together.

The support portion may be configured to: extend from a lower side of the substrate so as to pass through the LED mounting portion; and support a bottom surface of the LED mounting portion and a side end of the substrate protrusion.

The support portion may include a lower support portion which protrudes to support the substrate at a lower side and by which the substrate protrusion is spaced apart from a bottom of the bracket.

The lower support portion may include: a support portion groove recessed so that the LED mounting portion is inserted so as to restrict movement of the substrate in a front and rear direction; and a support portion protrusion protruding to support a side end of the substrate protrusion so as to restrict movement of the substrate in a left and right direction. The lower support portion may be configured to restrict the substrate that is in contact with a stepped portion between the LED mounting portion and the substrate protrusion.

The support portion may further include an upper support portion extending downward from an upper side of the lower support portion and in contact with a top surface of the substrate to restrict vertical movement of the substrate. The support portion may include an upper support portion extending downward from an upper side of the substrate to restrict a top surface of the substrate.

The upper support portion may include: a vertical extension portion extending downward toward the top surface of the substrate; and a horizontal extension portion bent from a lower end of the vertical extension portion to extend in a state of being in contact with the top surface of the substrate. The vertical extension portion may extend downward from an area corresponding to the substrate protrusion, and the horizontal extension portion may extend up to an area of the LED mounting portion.

The horizontal extension portion may pass between the LEDs that are continuously disposed. A protrusion guide extending backward to accommodate the substrate protrusion may be disposed on a rear surface of the bracket, wherein the protrusion guide may protrude backward to pass through a rear surface of the panel assembly.

The support portion may include: a lower support portion protruding upward from one side of the protrusion portion guide to allow the substrate protrusion to be spaced apart from a bottom surface of the protrusion guide; and a side support portion protruding from the other side of the protrusion guide toward the lower support portion to restrict a side end of the substrate protrusion.

The side support portion may include: a first support portion extending along a top surface of the LED mounting portion to restrict the LED mounting portion; and a second support portion extending along a top surface of the substrate protrusion to restrict the substrate protrusion, wherein the first support portion may further protrude than the second support portion.

A plurality of soldering portions connected to the wire may be disposed on the substrate protrusion, wherein the plurality of soldering portion are disposed top and bottom surfaces of the substrate, respectively, the LED may be mounted on a top surface of the LED mounting portion, and elements except for the LED may be mounted on a bottom surface of the LED mounting portion.

The bracket may include: a bracket front surface portion configured to define a front surface of the bracket and extend more upward than the LED; a bracket bottom surface portion which extends backward from a lower end of the bracket front surface and on which the lighting device is mounted; and a light guide plate support portion protruding backward from the front surface portion to support a lower end of the light guide plate, wherein the light guide plate support portion may extend to pass between the plurality of LEDs so as to restrict a top surface of the substrate, and the support portion may protrude upward from the bracket bottom surface portion to restrict the substrate at a lower side.

The panel assembly may further include a transmission member which is made of a material through which light is transmittable and on which the panel and the light guide plate are mounted, wherein the transmission member may include: a front surface portion configured to partition the panel and the light guide plate from each other and having a front surface on which the panel is mounted; and a side surface portion protruding backward from both left and right ends of the front surface portion to restrict both ends of the light guide plate. The side surface portion may have opened upper and lower ends, and the bracket may be inserted and mounted in the opened end of the side surface portion.

The panel assembly may include: an upper bracket inserted into the upper end of the side surface portion; and a back cover provided behind the transmission member and configured to connect the upper bracket to the bracket inserted into the lower end of the side surface portion so as to define a rear surface of the panel assembly, wherein a cover opening through which the substrate protrusion is exposed may be defined in the back cover.

In another embodiment, a refrigerator includes: a cabinet in which a storage space is defined; and a door configured to open and close the storage space, wherein the door includes: a door body rotatably mounted on the cabinet; and a panel assembly mounted on a front surface of the door body, wherein the panel assembly includes: a panel which is configured to define an outer appearance of a front surface of the door and through which light is transmitted; a light guide plate provided behind the panel to guide the light toward the panel; a lighting device including a plurality of LEDs configured to irradiate light having a set color toward the light guide plate and a substrate on which the LEDs are mounted to change a display color of the panel; and a bracket on which the lighting device is mounted, wherein a substrate protrusion which protrudes toward a front surface of the door body and to which a wire is connected is disposed on the substrate, and the bracket includes at least one or more support portions configured to support the substrate protrusion.

In further another embodiment, a panel assembly for a home appliance includes: a panel which is configured to define an outer appearance of a front surface of the door and through which light is transmitted; a light guide plate provided behind the panel to guide the light toward the panel; a lighting device including a plurality of LEDs configured to irradiate light having a set color toward the light guide plate and a substrate on which the LEDs are mounted to change a display color of the panel; and a bracket on which the lighting device is mounted, wherein a substrate protrusion which protrudes to pass through a rear surface of the panel assembly and to which a wire is connected is disposed on the substrate, and the bracket includes at least one or more support portions configured to support the substrate protrusion.

The details of one or more embodiments are set forth in the accompanying drawings and the description below. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance comprising:
   a cabinet in which a storage space is defined; and
   a door including a door body configured to open and close the storage space, and a panel assembly mounted on a front surface of the door body,
   wherein the panel assembly includes:
      a panel configured to define an outer appearance of a portion of a front surface of the door and through which light is transmitted;
      a light guide plate provided behind the panel and configured to guide the light toward the panel;
      a lighting device including a plurality of light emitting diodes (LEDs) configured to irradiate the light toward the light guide plate, and a substrate on which the LEDs are mounted; and
      a bracket on which the lighting device is mounted, and
   wherein:
      the substrate incudes a substrate protrusion configured to be electrically connected to a wire, and
      the bracket includes at least one support configured to support the substrate protrusion.

2. The home appliance according to claim 1, wherein
   the substrate includes an LED mounting region which is provided at a position facing an end of the light guide plate and on which the plurality of LEDs are provided, and
   the substrate protrusion protrudes from the LED mounting region to pass through a rear surface of the panel assembly.

3. The home appliance according to claim 2, wherein the at least one support is configured to support the LED mounting region and the substrate protrusion together.

4. The home appliance according to claim 3, wherein the at least one support is configured to:
   extend from a lower side of the substrate so as to extend along the LED mounting region; and
   support a bottom surface of the LED mounting region and a side end of the substrate protrusion.

5. The home appliance according to claim 2, wherein the at least one support includes a lower support which protrudes to support a lower side of the substrate and by which the substrate protrusion is spaced apart from a bottom of the bracket.

6. The home appliance according to claim 5, wherein the lower support includes:
   a support portion groove recessed to receive the LED mounting region so as to restrict a movement of the substrate in a front and rear direction; and a support portion protrusion protruding to support a side end of the substrate protrusion so as to restrict a movement of the substrate in a left and right direction.

7. The home appliance according to claim 5, wherein the lower support portion is configured to restrict the substrate that is in contact with a stepped portion between the LED mounting region and the substrate protrusion.

8. The home appliance according to claim 5, wherein the support further include an upper support extending downward from an upper side of the lower portion and in contact with a top surface of the substrate to restrict a vertical movement of the substrate.

9. The home appliance according to claim 2, wherein the support includes an upper support extending downward from an upper side of the substrate to restrict a top surface of the substrate.

10. The home appliance according to claim 9, wherein the upper support includes:
    a vertical extension extending downward toward the top surface of the substrate; and
    a horizontal extension extending a bent angle from a lower end of the vertical extension to contact the top surface of the substrate.

11. The home appliance according to claim 10, wherein the vertical extension extends downward from an area corresponding to the substrate protrusion, and
    the horizontal extension portion extends up to the LED mounting region.

12. The home appliance according to claim 10, wherein the horizontal extension passes between two of the LEDs.

13. The home appliance according to claim 2,
    wherein the bracket includes a protrusion guide extending backward to accommodate the substrate protrusion,
    wherein the protrusion guide is provided on a rear surface of the bracket, and
    wherein the protrusion guide protrudes backward to pass through a rear surface of the panel assembly.

14. The home appliance according to claim 13, wherein the support includes:
    a lower support protruding upward from a first side of the protrusion guide and is configured to space the substrate protrusion apart from a bottom surface of the protrusion guide; and
    a side support protruding from a second side of the protrusion guide toward the lower support to restrict a side end of the substrate protrusion.

15. The home appliance according to claim 14,
    wherein the side support includes:
    a first support surface extending along a top surface of the LED mounting region to restrict the LED mounting region; and
    a second support surface extending along a top surface of the substrate protrusion to restrict the substrate protrusion, and
    wherein the first support surface further protrudes than the second support surface.

16. The home appliance according to claim 14,
    wherein a plurality of soldering pads configured to be connected to the wire are provided on the substrate protrusion,
    wherein the plurality of soldering pads are provided on top and bottom surfaces of the substrate, respectively, and
    wherein the LEDs are mounted on a top surface of the LED mounting region, and at least one of an element for driving the LEDs or an element for signal processing is mounted on a bottom surface of the LED mounting region.

17. The home appliance according to claim 1,
    wherein the bracket includes:
    a bracket front surface configured to define a front surface of the bracket and extend more upward than the LED;
    a bracket bottom surface which extends backward from a lower end of the bracket front surface and on which the lighting device is mounted; and
    a light guide plate support protruding backward from the front surface to support a lower end of the light guide plate,
    wherein the light guide plate support extends to pass between two of the plurality of LEDs so as to restrict a top surface of the substrate, and
    wherein the support portion protrudes upward from the bracket bottom surface to restrict a lower side of the substrate.

18. The home appliance according to claim 1,
    wherein the panel assembly further includes a transmission member which is made of a light transmitting material and on which the panel and the light guide plate are mounted,
    wherein the transmission member includes:
    a front surface wall configured to partition the panel and the light guide plate from each other and having a front surface on which the panel is mounted; and
    a side surface wall protruding backward from left and right ends of the front surface wall to restrict sides of the light guide plate.

19. The home appliance according to claim 18, wherein the transmission member has opened upper and lower ends, and
    the bracket is inserted and mounted in the opened lower end of the transmission member.

20. The home appliance according to claim 19,
    wherein the panel assembly includes:
    an upper bracket inserted into the opened upper end of the transmission member; and
    a back cover provided behind the transmission member and configured to connect to the upper bracket and the bracket so as to define a rear surface of the panel assembly,
    wherein a cover opening through which the substrate protrusion is exposed is defined in the back cover.

21. The home appliance according to claim 1, wherein the substrate protrusion protrudes toward a front surface of the door body.

* * * * *